(12) United States Patent
Aoshima et al.

(10) Patent No.: US 6,979,918 B2
(45) Date of Patent: Dec. 27, 2005

(54) ACTUATOR

(75) Inventors: Chikara Aoshima, Kanagawa (JP); Kaori Horiike, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/735,660

(22) Filed: Dec. 16, 2003

(65) Prior Publication Data

US 2004/0124719 A1 Jul. 1, 2004

(30) Foreign Application Priority Data

Dec. 20, 2002 (JP) .................................. 2002-369125
Dec. 26, 2002 (JP) .................................. 2002-378032
Jul. 28, 2003 (JP) .................................. 2003-280919

(51) Int. Cl.[7] .............................................. H02K 1/12
(52) U.S. Cl. .................. 310/49 A; 310/257; 310/156.15
(58) Field of Search ............................. 310/49 R, 49 A, 310/254, 257–259, 156.08, 156.09, 156.11, 156.15

(56) References Cited

U.S. PATENT DOCUMENTS

| | | | | |
|---|---|---|---|---|
| 3,624,440 A | * | 11/1971 | Latussek | 310/162 |
| 4,445,061 A | * | 4/1984 | Jackson, Jr. | 310/156.08 |
| 5,168,187 A | | 12/1992 | Baer et al. | 310/49 R |
| 5,193,266 A | * | 3/1993 | Caputo | 29/598 |
| 5,384,506 A | | 1/1995 | Aoshima | 310/49 R |
| 5,780,944 A | * | 7/1998 | Sakamoto | 310/49 R |
| 5,831,356 A | | 11/1998 | Aoshima | 310/49 R |
| 5,925,945 A | | 7/1999 | Aoshima | 310/49 R |
| 5,945,753 A | | 8/1999 | Maegawa et al. | 310/68 B |
| 5,969,453 A | | 10/1999 | Aoshima | 310/156 |
| 5,973,425 A | | 10/1999 | Aoshima | 310/49 R |
| 6,046,517 A | | 4/2000 | Sasaki et al. | 310/40 MM |
| 6,081,053 A | | 6/2000 | Maegawa et al. | 310/49 R |
| 6,157,107 A | | 12/2000 | Aoshima et al. | 310/156 |
| 6,172,440 B1 | | 1/2001 | Sasaki et al. | 310/156 |
| 6,255,749 B1 | | 7/2001 | Aoshima et al. | 310/49 R |
| 6,316,851 B1 | | 11/2001 | Maegawa et al. | 310/49 R |
| 6,400,055 B1 | | 6/2002 | Aoshima et al. | 310/156.01 |
| 6,411,003 B1 | | 6/2002 | Sasaki et al. | 310/156.02 |
| 6,465,916 B1 | | 10/2002 | Aoshima | 310/49 R |
| 6,559,569 B2 | | 5/2003 | Aoshima | 310/112 |
| 6,617,747 B1 | * | 9/2003 | Petersen | 310/254 |
| 6,784,582 B1 | * | 8/2004 | Kolomeitsev et al. | 310/156.38 |
| 6,800,969 B2 | * | 10/2004 | Ogawa | 310/49 R |
| 6,831,356 B2 | | 12/2004 | Terada et al. | 257/691 |
| 2002/0008491 A1 | | 1/2002 | Aoshima | 318/696 |
| 2002/0047415 A1 | | 4/2002 | Aoshima | 310/112 |
| 2003/0015923 A1 | | 1/2003 | Aoshima | 310/49 R |
| 2003/0062801 A1 | | 4/2003 | Aoshima | 310/261 |

FOREIGN PATENT DOCUMENTS

| | | |
|---|---|---|
| JP | 61-128762 | 6/1986 |
| JP | 9-331666 | 12/1997 |
| JP | 10-229670 | 8/1998 |
| JP | 2000-232766 | 8/2000 |
| JP | 2002-49076 | 2/2002 |

OTHER PUBLICATIONS

Official Action/Search Report from the Korean Patent Office.

* cited by examiner

*Primary Examiner*—Dang Le
(74) *Attorney, Agent, or Firm*—Fitzpatrick, Cella, Harper & Scinto

(57) ABSTRACT

An actuator according to the present invention includes: a rotor that includes a magnet that has a cylindrical shape, and an outer peripheral surface alternately magnetized into different poles in a peripheral direction, and a soft magnetic member that is fixed to an inner diameter portion of the magnet; a coil that is concentric with the magnet, and arranged adjacently to the magnet in an axial direction thereof; and a stator that has a magnetic pole portion opposed to the outer peripheral surface of the magnet, in which the soft magnetic member composing the rotor and the stator are excited by the coil.

13 Claims, 14 Drawing Sheets

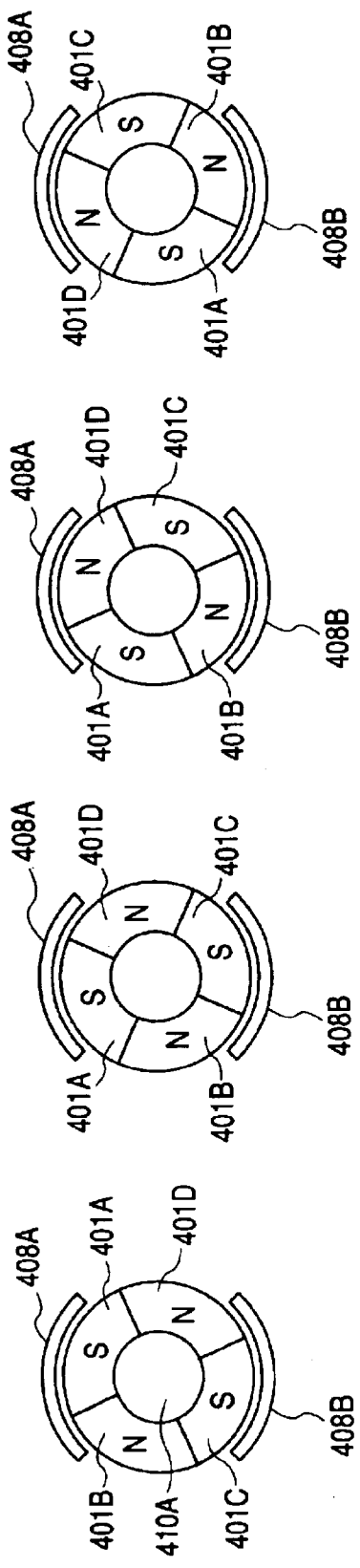
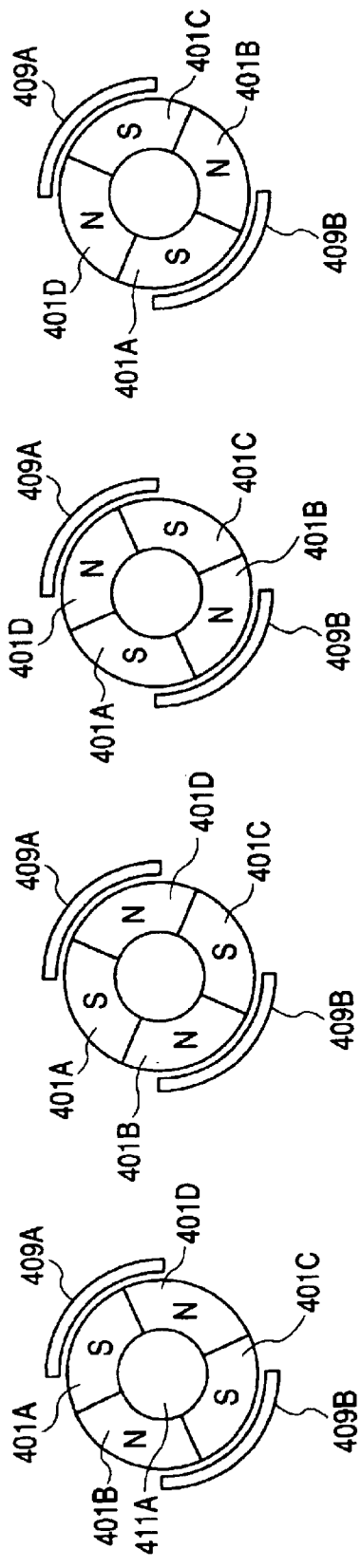

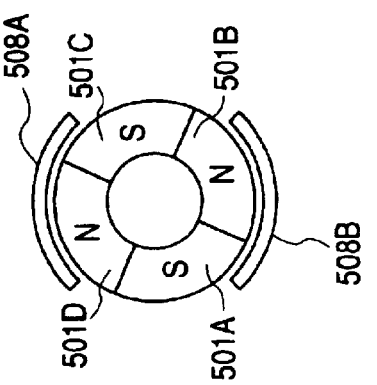
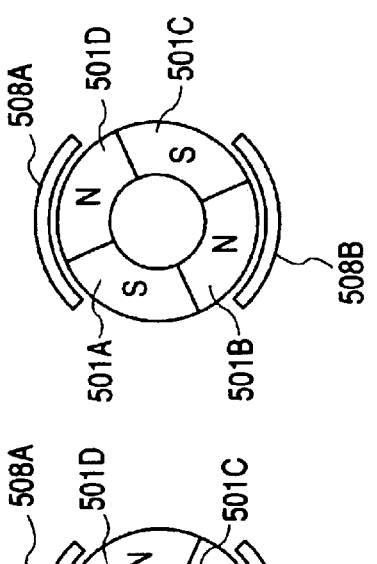
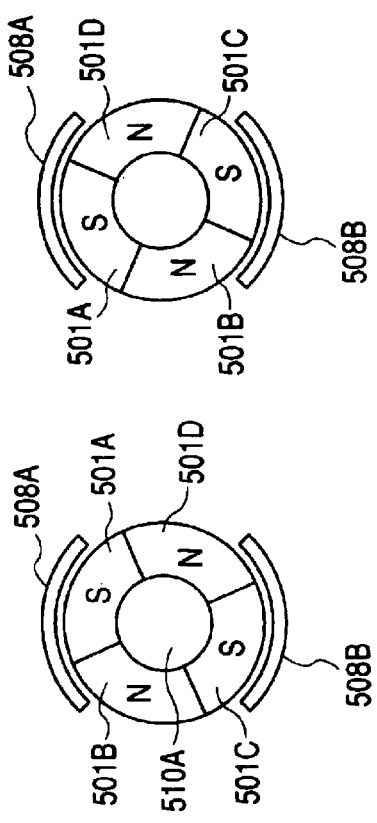
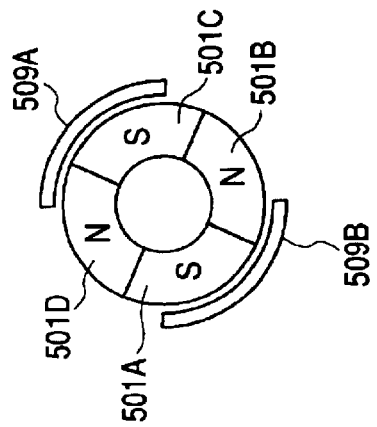
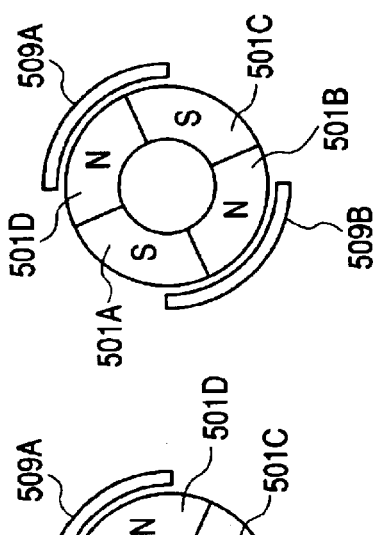
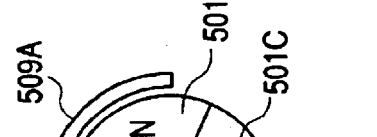

ACTUATOR

BACKGROUND OF THE INVENTION

1. Field of the Invention

The present invention relates to an actuator, and more particularly to an improvement of an actuator having a cylindrical shape.

2. Related Background Art

A stepping motor having a reduced diameter about a rotation axis and an enhanced output level is disclosed in Japanese Patent Application Laid-open No. H09-331666. FIG. 1 shows an exploded perspective view of a stepping motor disclosed in Japanese Patent Application Laid-open No. H09-331666. FIG. 2 shows a sectional view of an assembled stepping motor taken along its axis.

FIGS. 1 and 2 show a rotor 101 having a cylindrical shape which is formed of permanent magnet (simply referred to as "magnet" in Japanese Patent Application Laid-open No. H09-331666) divided into four parts in a peripheral direction so as to alternately magnetize the parts into different polarities, a first coil 102 arranged adjacently to the rotor 101 in an axial direction, a second coil 103 similarly arranged adjacently to the rotor 101 in the axial direction, a first stator 104 that is formed of a soft magnetic material and excited by the first coil 102, and a second stator 105 that is formed of a soft magnetic material and excited by the second coil 103.

The first stator 104 includes first outside magnetic pole portions 104A and 104B that are opposed to an outer peripheral surface of the rotor 101 so as to have a clearance therebetween and first inside magnetic pole portions 104C and 104D that are opposed to an inner peripheral surface of the rotor 101 so as to have a clearance therebetween. The second stator 105 includes second outside magnetic pole portions 105A and 105B that are opposed to the outer peripheral surface of the rotor 101 so as to have a clearance therebetween and second inside magnetic pole portions 105C and 105D that are opposed to the inner peripheral surface of the rotor 101 so as to have a clearance therebetween.

The rotor 101 is fixed to an output shaft 106. The output shaft 106 is rotatably supported by a bearing portion 104E of the first stator 104 and a bearing portion 105E of the second stator 105. The first stator 104 and the second stator 105 are held by a coupling ring 107 formed of a non-magnetic material so as to have a predetermined clearance between the two stators.

With the above arrangement, a current flowing through the first coil 102 is reversed in direction to switch the polarities of the first outside magnetic pole portions 104A and 104B and the polarities of the first inside magnetic pole portions 104C and 104D, and a current flowing through the second coil 103 is similarly reversed in direction to switch the polarities of the second outside magnetic pole portions 105A and 105B and the polarities of the second inside magnetic pole portions 105C and 105D. This process is repeated to rotate the rotor 101.

In the stepping motor described above, magnetic flux lines generated by causing currents to flow through the coil pass from the outside magnetic pole portion to the inside magnetic pole portion opposed thereto or from the inside magnetic pole portion to the outside magnetic pole portion opposed thereto, thereby acting efficiently on each magnet composing the rotor arranged between the outside magnetic pole portion and the inside magnetic pole portion. Further, a distance between the outside magnetic pole portion and the inside magnetic pole portion that are opposed to each other can be set as being approximately as large as the thickness of the magnet having a cylindrical shape, thereby making it possible to reduce the resistance of a magnetic circuit formed by the outside magnetic pole portion and the inside magnetic pole portion. As the resistance of the magnetic circuit becomes smaller, more magnetic flux lines can be generated with a smaller amount of current, resulting in the enhanced output level.

Alternatively, Japanese Patent Application Laid-open No. H10-229670 discloses a structure of a motor obtained by further improving the above stepping motor. In the structure, an inside magnetic pole portion is formed into a cylindrical shape, an output shaft inserted into an inner portion of the inside magnetic pole portion is formed of a soft magnetic material and attached to a stator (composed of the inside magnetic pole portion and the outside magnetic pole portion), and a bearing that rotatably supports the output shaft is formed of a soft magnetic material. According to the proposed structure, the output shaft is also included in a magnetic circuit, enhancing the output of the motor. Adsorption between the stator and the output shaft, which may occur due to magnetism in the proposed structure, is prevented by forming the bearing of a, non-magnetic material.

However, the motor disclosed in Japanese Patent Application Laid-open No. H10-229670 has a problem in that magnetic flux lines generated by causing a current to flow through a first coil adversely affects a second coil, a second outside magnetic pole portion, and a second inside magnetic pole portion via the output shaft formed of a soft magnetic material, and magnetic flux lines generated by causing a current to flow through a second coil adversely affects a first coil, a first outside magnetic pole portion, and a first inside magnetic pole portion via the output shaft formed of a soft magnetic material, resulting in unstable rotation.

The motors disclosed in Japanese Patent Application Laid-open No. H09-331666 and Japanese Patent Application Laid-open No. H10-229670 each have a problem in that a predetermined clearance is necessary between the inner periphery of the magnet and the inside magnetic pole portion opposed thereto, and management of the clearance during manufacture causes an increase in manufacturing cost. There is another problem in that the stator needs to include the inside magnetic pole portion and the outside magnetic pole portion that are formed into the cylindrical shape, and it is difficult to integrally structure those portions in terms of manufacturing processes for parts. Further, there is still another problem in that in the case where those portions are separately manufactured and then integrally assembled, the number of necessary parts becomes large, causing another increase in manufacturing cost.

Further alternatively, a light quantity controller using a stepping motor that is driven on the same principle as the above-mentioned stepping motor is proposed in Japanese Patent Application Laid-open No. 2002-049076.

FIG. 3 shows an exploded perspective view of the actuator solely extracted from the light quantity controller disclosed in Japanese Patent Application Laid-open No. 2002-049076. FIG. 4 shows a sectional view in the case where the actuator of FIG. 3 is assumed to be cut along its axis.

FIGS. 3 and 4 show a magnet 201 having a cylindrical shape whose outer peripheral surface is divided into four parts in a peripheral direction and alternately magnetized into S poles and N poles and which can be rotated around the center of rotation, and a coil 202 having a cylindrical shape which is arranged in the axial direction of the magnet 201. The coil 202 excites a stator 203 that includes in its tip portion an outside magnetic pole portion 203a having a shape of a tooth and includes an inner cylinder 203b having a column-shaped portion in its tip. The outside magnetic pole portion 203a and the inner cylinder 203b are respectively opposed to the outer peripheral surface and the inner peripheral surface of the magnet 201. An auxiliary stator 204 is fixed to the inner cylinder 203b of the stator 203, and the auxiliary stator 204 and the inner cylinder 203b compose an inside magnetic pole portion. A base plate 205 includes a guide slot 205a engaged with a drive pin 201d that is provided to the magnet 201.

The portions described above compose the actuator of the light quantity controller.

The magnet 201 includes the drive pin 201d engaged with the guide slot 205a of the base plate 205, and shaft portions 201e and 201f such that the magnet 201 is rotatably supported by the base plate 205 and the stator 203. The magnet 201, the guide slot 205a, and the shaft portions 201e and 201f are unitarily molded. The outside magnetic pole portion 203a of the stator 203 is opposed to the outer peripheral surface of the magnet 201 so as to have a clearance therebetween. Similarly, the inside magnetic pole portion (composed of the inner cylinder 203b of the stator 203 and the auxiliary stator 204) is opposed to the inner peripheral surface of the magnet 201 so as to have a clearance therebetween.

With the actuator having the above-mentioned arrangement, currents flowing through the coil 202 is reversed in direction to switch the polarities of the outside magnetic pole portion 203a and the inside magnetic pole portion (the inner cylinder 203b and the auxiliary stator 204). This process is repeated to reciprocate the magnet 201 within a regulated range. Note that the rotational regulation for the reciprocating magnet 201 is performed by the guide slot 205a provided to the base plate 205 and the drive pin 201d engaged with the guide slot 205a.

In the actuator described above, magnetic flux lines generated by causing a current to flow through the coil pass from the outside magnetic pole portion 203a to the inside magnetic pole portion opposed thereto or from the inside magnetic pole portion to the outside magnetic pole portion 203a opposed thereto, thereby acting efficiently on the magnet 201 placed between the outside magnetic pole portion 203a and the inside magnetic pole portion. Further, the distance between the outside magnetic pole portion 203a and the inside magnetic pole portion that are opposed to each other can be set as being as large as the thickness of the magnet 201 having a cylindrical shape with the clearance between the magnet 201 and the outside magnetic pole portion 203a and the clearance between the magnet 201 and the inside magnetic pole portion being added thereto, thereby making it possible to reduce the resistance of a magnetic circuit formed by the outside magnetic pole portion 203a and the inside magnetic pole portion. As the resistance of the magnetic circuit becomes smaller as described above, more magnetic flux lines can be generated with a smaller amount of current, resulting in the enhanced output level.

According to the above-mentioned actuator, as described above, the distance between the outside magnetic pole portion 203a and the inside magnetic pole portion that are opposed to each other can be set as being as large as the thickness of the magnet 201 having a cylindrical shape with the clearance between the magnet 201 and the outside magnetic pole portion 203a and the clearance between the magnet 201 and the inside magnetic pole portion being added thereto, thereby making it possible to reduce the resistance of the magnetic circuit.

However, in the above arrangement, the magnet 201 secures predetermined clearances with respect to the outside magnetic pole portion 203a and the inside magnetic pole portion, respectively. If one of the clearances is eliminated, the distance between the outside magnetic pole portion 203a and the inside magnetic pole portion becomes smaller by the width of the clearance, so that further reduction can be expected for the resistance of the magnetic circuit. Note that it can be taken into consideration to reduce the diameter of the actuator and to reduce the radial thickness of the magnet 201 having a cylindrical shape in order to reduce the distance between the outside magnetic pole portion 203a and the inside magnetic pole portion. However, such reduction causes a problem with the strength of the magnet 201, making it difficult to employ a structure merely with the magnet 201 having a smaller thickness. In addition, in the case where a predetermined clearance is necessary between the inner diameter of the magnet 201 and the inside magnetic pole portion opposed thereto as in Japanese Patent Application Laid-open No. 2002-049076, management of the clearance is also necessary during manufacture, causing an increase in manufacturing cost.

SUMMARY OF THE INVENTION

The present invention is made in view of the above problems. According to a first aspect of the present invention, there is provided an actuator, including: a rotor that includes a magnet that has a cylindrical shape and an outer peripheral surface alternately magnetized into different poles in a peripheral direction, and a soft magnetic member that is fixed to an inner diameter portion of the magnet; a coil that is concentric with the magnet, and arranged adjacently to the magnet in an axial direction thereof; and a stator that has a magnetic pole portion opposed to the outer peripheral surface of the magnet, in which the soft magnetic member composing the rotor and the stator are excited by the coil. In the actuator, a distance between an inside magnetic portion and an outside magnetic portion that are arranged so as to oppose each other is reduced by making a portion to be fixed to the inner diameter portion of the magnet (the soft magnetic member that composes the rotor together with the magnet) act as the inside magnetic portion.

Further, according to a second aspect of the present invention, there is provided a stepping motor, including: a magnet ring that is equally divided in a peripheral direction, and includes a permanent magnet having a cylindrical shape and having different poles magnetized alternately; a first coil and a second coil each having a cylindrical shape, which are concentric with the magnet ring, and arranged in opposite positions across the magnet ring along an axial direction thereof; a first outside magnetic pole portion that is opposed to a partial outer peripheral surface of the magnet ring on a side of the first coil so as to have a predetermined clearance, and is excited by the first coil; a second outside magnetic pole portion that is opposed to another partial outer peripheral surface of the magnet ring on a side of the second coil so as to have a predetermined clearance, and is excited by the second coil; a first shaft that is formed of a soft magnetic material, inserted into an inner diameter portion of the first coil, and fixed to an inner diameter portion of the magnet ring; and a second shaft that is formed of a soft magnetic material, inserted into an inner diameter portion of the second coil, and fixed to an inner diameter portion of the magnet ring.

Further, according to a third aspect of the present invention, there is provided a stepping motor, including: a magnet ring that is equally divided in a peripheral direction, and includes a permanent magnet having a cylindrical shape and having different poles magnetized alternately; a first coil and a second coil that are concentric with the magnet ring, and arranged in opposite positions across the magnet ring along an axial direction thereof; a first outside magnetic pole portion that is opposed to a partial outer peripheral surface of the magnet ring closer to one end surface thereof, and is excited by the first coil; a second outside magnetic pole portion that is opposed to another partial outer peripheral surface of the magnet ring closer to another end surface thereof, and is excited by the second coil; and a rotation shaft that is formed of a soft magnetic material, is fixed to an inner diameter portion of the magnet ring, and includes at least an inside magnetic pole portion that is respectively opposed to one of the first outside magnetic pole portion and the second outside magnetic pole portion in an axial range thereof, and are respectively excited by one of the first coil and the second coil.

Further, according to a fourth aspect of the present invention, there is provided a stepping motor, including: a magnet ring that is equally divided in a peripheral direction, and includes a permanent magnet having a cylindrical shape and having different poles magnetized alternately; a first coil and a second coil that are concentric with the magnet ring, and arranged in opposite positions across the magnet ring along an axial direction thereof; a first outside magnetic pole portion that is opposed to a partial outer peripheral surface of the magnet ring closer to one end surface thereof, and is excited by the first coil; a second outside magnetic pole portion that is opposed to another partial outer peripheral surface of the magnet ring closer to another end surface thereof, and is excited by the second coil; and a rotation shaft that is formed of a soft magnetic material, is fixed to an inner diameter portion of the magnet ring, includes a first inside magnetic pole portion and a second inside magnetic pole portion that are respectively opposed to the first outside magnetic pole portion and the second outside magnetic pole portion in axial ranges thereof and are respectively excited by the first coil and the second coil, and is formed with a groove between the axial range of the first inside magnetic pole portion opposed to the first outside magnetic pole portion and the axial range of the second inside magnetic pole portion opposed to the second outside magnetic pole portion.

Other objects and features of the present invention will become readily apparent upon reading the following description of the specification and the drawings.

BRIEF DESCRIPTION OF THE DRAWINGS

FIGS. 13A, 13B, 13C, 13D, 13E, 13F, 13G and 13H are diagrams for explaining rotation operations of the rotor of the stepping motor according to the third embodiment of the present invention;

FIGS. 18A, 18B, 18C, 18D, 18E, 18F, 18G and 18H are diagrams for explaining rotation operations of the rotor of the stepping motor according to the fifth embodiment of the present invention.

DESCRIPTION OF THE PREFERRED EMBODIMENTS

Hereinafter, embodiments of the present invention will be described in detail with reference to the accompanying drawings.

First Embodiment

Figure 5:
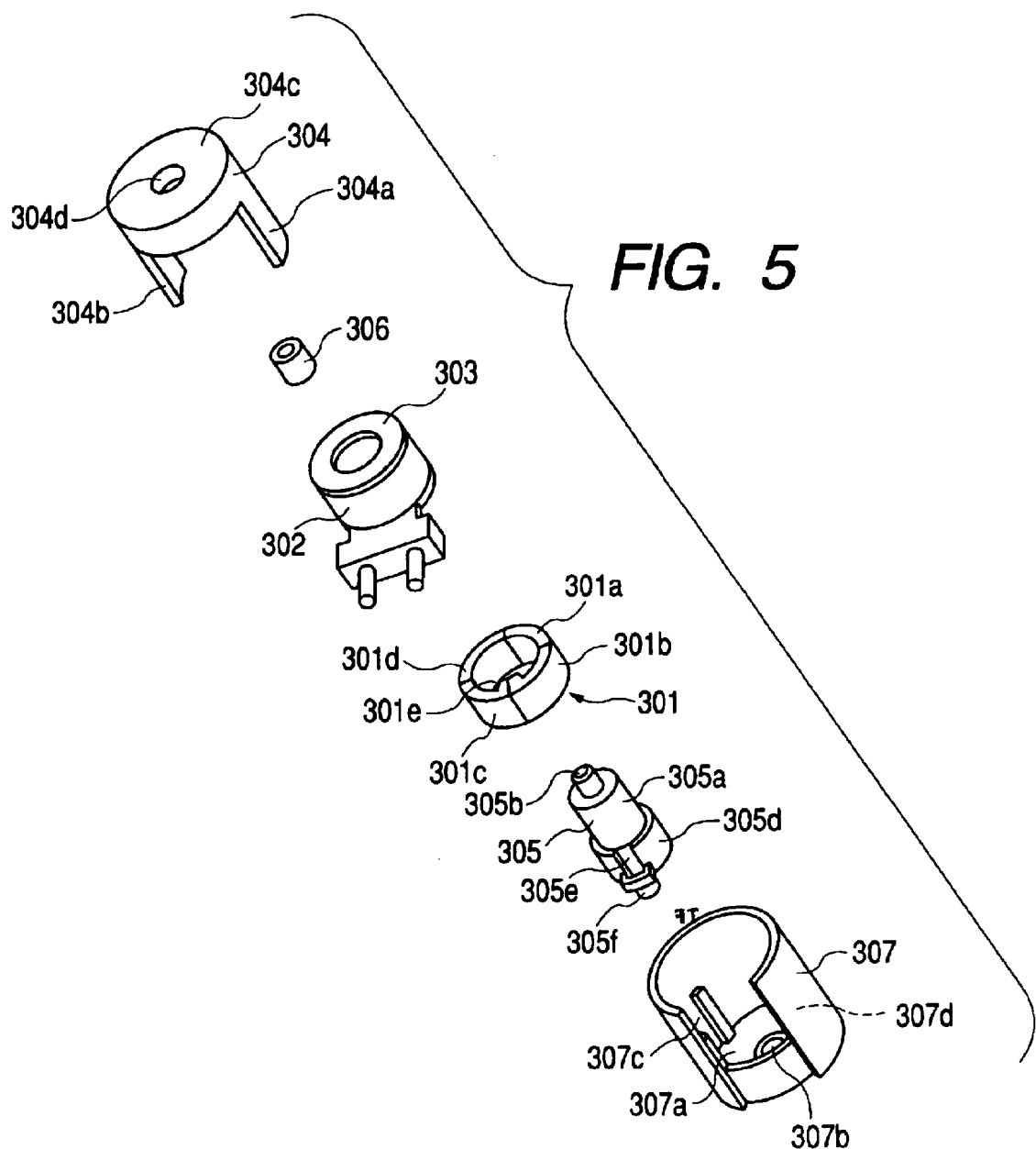
FIG. 5 is an exploded perspective view of an actuator according to a first embodiment of the present invention.
Figure 6:
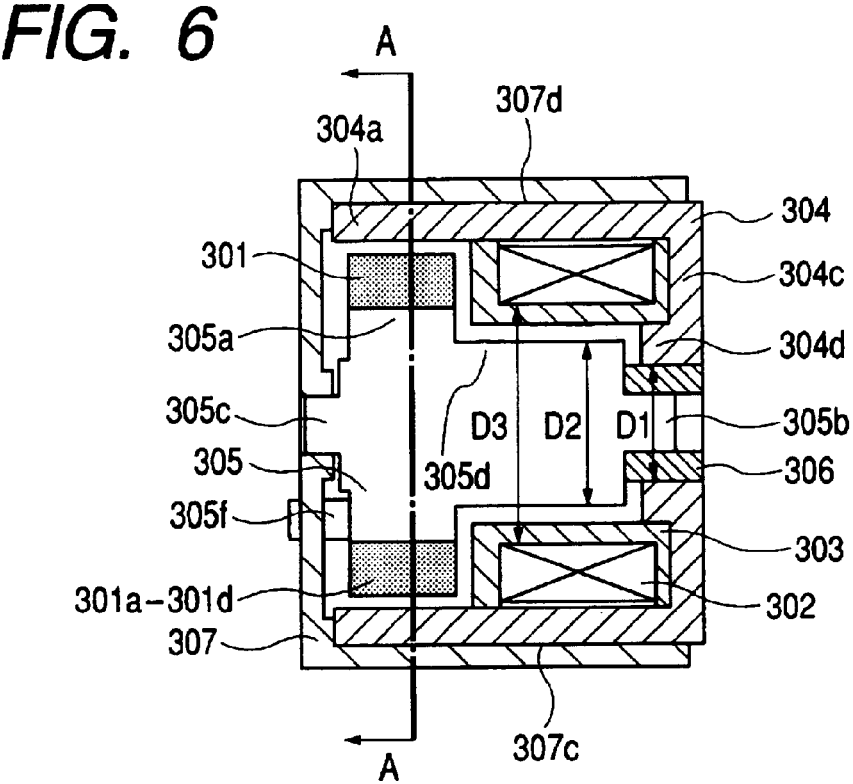
FIG. 6 is a sectional view of the actuator of FIG. 5 taken along its axial direction after the stepping motor has been assembled.
Figure 7:
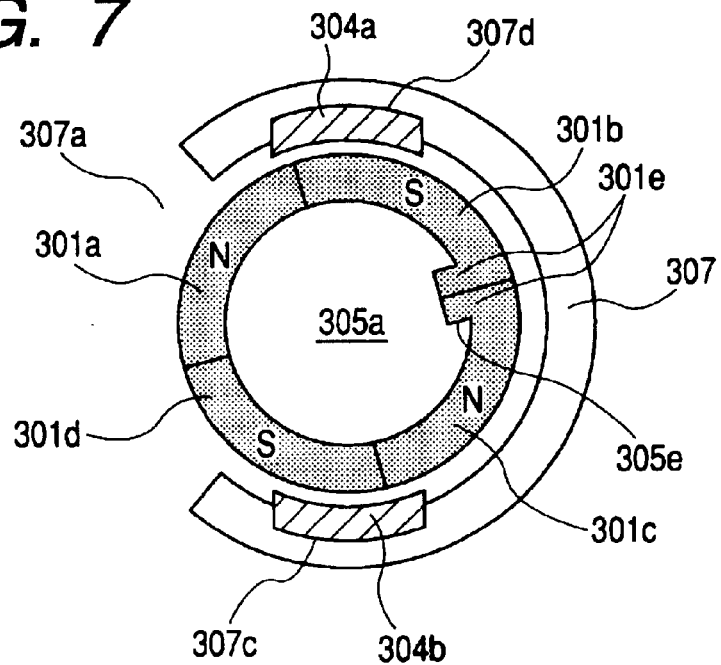
FIG. 7 is a sectional view of the actuator of FIG. 5 in a first state, which is taken along a line A—A of FIG. 6.
Figure 8:
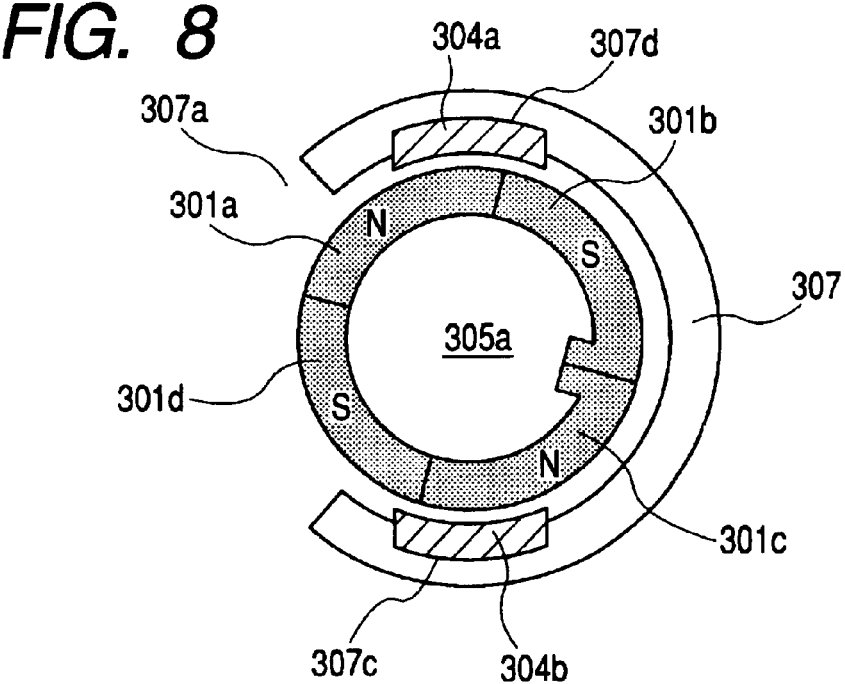
FIG. 8 is a sectional view of the actuator of FIG. 5 in a second state, which is taken along the line A—A of FIG. 6.

FIG. 5 is an exploded perspective view of an actuator according to a first embodiment of the present invention, and FIG. 6 is a sectional view of the actuator of FIG. 5 which is taken along its axial direction after the actuator has been assembled. FIGS. 7 and 8 are diagrams showing a manner in which the actuator shown in FIG. 5 reciprocatively rotates within a predetermined regulated range. More specifically, FIG. 7 is a sectional view taken along a line A—A of FIG. 6 in a first state where a projection provided to a rotor soft magnetic member contacts one end of a guide groove of a fixing member, and FIG. 8 is a sectional view taken along the line A—A of FIG. 6 in a second state where the projection provided to the rotor soft magnetic member contacts the other end of the guide groove of the fixing member.

FIGS. 5 to 8 show that a magnet 301 having a substantially cylindrical shape which is formed of a plastic magnet has a projection 301e in its inner diameter portion, and the projection 301e is adapted to fit into a groove 305e provided to a rotor soft magnetic member 305 described later. The magnet 301 is formed by dividing its outer peripheral surface into n parts (where n is 4 in this embodiment) in a peripheral direction and alternately magnetizing the n parts into S poles and N poles. More specifically, as shown in FIG. 7, the outer peripheral surfaces of magnetic portions 301a and 301c have been magnetized into the N poles and the outer peripheral surfaces of magnetic portions 301b and 301d have been magnetized into the S poles, so as to have a constant magnetic phase with respect to the projection 301e provided to the inner diameter portion. The four magnetic poles are used in this embodiment, but any number of poles can be used as long as at least two poles are used. Note that if the inner peripheral surfaces of the magnetic portions 301a and 301c can be magnetized into the S poles having the opposite polarity to the polarity applied to their outer peripheral surfaces and the inner peripheral surfaces of the magnetic portions 301b and 301d can be magnetized into the N poles having the opposite polarity to the polarity applied to their outer peripheral surfaces.

A coil 302 having a cylindrical shape is obtained by being wound around a bobbin 303 formed of an insulating material. The coil 302 concentric with the magnet 301 is arranged in a position adjacent to the magnet 301 in a direction of the rotation axis of the magnet 301, and has an outer diameter of approximately the same size as the outer diameter of the magnet 301.

A stator 304 formed of a soft magnetic material includes: in its tip portion, n/2 (two in this embodiment) outside magnetic pole portions 304a and 304b having a shape of a tooth; a surface 304c that is perpendicular to an axial direction and on the opposite side to tooth tips of the outside magnetic pole portions 304a and 304b; and a cylindrical portion 304d that has a small height and is provided to the central portion of the surface 304c. The outside magnetic pole portions 304a and 304b have a shape in which multiple groups of multiple magnetic poles extending in the rotational direction of the magnet 301 are arranged in the peripheral direction. The respective magnetic poles are arranged along the shape of the surface of the magnet 301 opposed to the magnetic poles. The outside magnetic pole portions 304a and 304b are respectively opposed to the outer peripheral surface of the magnet 301 so as to have a predetermined clearance therebetween. The outside magnetic pole portions 304a and 304b are formed so as to be shifted by 720/n° (180° in this embodiment). By fitting the outside magnetic pole portions 304a and 304b into grooves 307c and 307d provided to an inner peripheral surface of a cover 307 described later, the stator 304 is fixed thereto. The cylindrical portion 304d, into which a bearing described later is fixedly fitted, has such a diameter and a height as to minimize a distance to a columnar portion 305d of a rotor soft magnetic member 305 described later forming a magnetic circuit together with the stator 304. In this embodiment, an inner diameter D1 of the cylindrical portion 304d is smaller than the outer diameter of the columnar portion 305d of the rotor soft magnetic member 305 described later, and is such a diameter as to have an overlapped portion between the stator 304 and the rotor soft magnetic member 305 when view from the axial direction.

The rotor soft magnetic member 305 is formed of a soft magnetic material to serve as an output shaft of the actuator, and composes a rotor together with the magnet 301. The rotor soft magnetic member 305 has the columnar portion 305d inserted into an inner diameter portion of the coil 302, and has a columnar portion 305a directly fixed into the inner diameter portion of the magnet 301. When fixing the magnet 301 and the rotor soft magnetic member 305, the projection 301e provided to the inner diameter portion of the magnet 301 is fixedly fitted into the groove 305e provided to the rotor soft magnetic member 305, thereby adjusting the magnetic phase of the magnet 301 with respect to the phase of the rotor soft magnetic member 305 (strictly, an output pin 305f). The columnar portion 305a of the rotor soft magnetic member 305 is opposed to the outside magnetic pole portions of the stator 304, which are opposed to the magnet 301, to form an inside magnetic pole portion (hereinafter, the columnar portion 305a is referred to as "inside magnetic pole portion 305a") so as to sandwich the magnet 301. The inside magnetic pole portion 305a of the rotor soft magnetic member 305 is excited by the coil 302 into the pole opposite to that of the outside magnetic pole portion 304a or 304b of the stator 304. By setting an outer diameter D2 of the columnar portion 305d to be as large as possible in such a range as not to contact the coil 302, the inside magnetic pole portion 305a is effectively excited by the coil 302. Further, as shown in FIG. 6, the diameter D2 of the columnar portion 305d is set to be larger than the inner diameter D1 of the cylindrical portion 304d of the stator 304 so as to have an overlapped portion between the stator 304 and the rotor soft magnetic member 305 when view from the axial direction. Accordingly, the distance between the stator 304 and the rotor soft magnetic member 305, more specifically, the distance between the cylindrical portion 304d and the columnar portion 305d in the axial direction, becomes smaller (decreases), and the magnetic circuit functions more effectively, thereby providing an actuator with an increased output.

A bearing 306 formed from soft magnetic material, which is fixed to the stator 304 and into which a shaft portion 305b of the rotor soft magnetic member 305 is fitted, rotatably supports the rotor soft magnetic member 305. The bearing 306 is preferably formed of a material having as small a frictional force as possible in its contact surface with the rotor soft magnetic member 305.

The cover 307 that covers the actuator includes a guide groove 307a. By bringing the output pin 305f of the rotor soft magnetic member 305 into abutment with one of two inner ends of the guide groove 307a, the rotation of the rotor soft magnetic member 305 is regulated. The cover 307 also includes a fitting portion 307b into which a shaft portion 305c of the rotor soft magnetic member 305 is rotatably fitted. The cover 307 further includes a groove 307c and a groove 307d (not shown) in its inside. The outside magnetic pole portions 304a and 304b of the stator 304 are fitted into the grooves 307d and 307c, respectively, to be fixed by an adhesive or the like. The relationship of the phases of the guide groove 307a and the grooves 307c and 307d in the cover 307 is constant, and the magnetic phase of the magnet 301 and the phase of the output pin 305f of the rotor soft magnetic member 305 are also set as being constant. Thus, the phases of the outside magnetic pole portions 304a and 304b of the stator 304 and the phases of the magnetic portions 301a to 301d of the magnet 301 can be determined in a rotational range of the rotor soft magnetic member 305. In the first embodiment, when the stepping motor is just in the middle of its rotatable angle range of the actuator, there is such a relationship in terms of phases that a boundary portion between the different poles of the magnet 301 is opposed to the central portion of the outside magnetic pole portion 304a or 304b having a tooth shape of the stator 304.

In the state of FIG. 7 (which refers to a first state where, although not shown in FIG. 7, the output pin 305f of the rotor soft magnetic member 305 abuts against one end of the guide groove 307a of the cover 307), a current is caused to flow through the coil 302 to excite the outside magnetic pole portions 304a and 304b of the stator 304 into the S pole and the inside magnetic pole portion 305a of the rotor soft magnetic member 305 into the N pole. At this time, the magnet 301 starts to rotate clockwise, and the rotor soft magnetic member 305 integrated thereto concurrently starts to rotate. Then, the output pin 305f of the rotor soft magnetic member 305 abuts against the other end of the guide groove 307a of the cover 307, so that the magnet 301 and the rotor soft magnetic member 305 stop rotating, resulting in the state shown in FIG. 8.

In the state of FIG. 8 (which refers to a second state where, although not shown in FIG. 8, the output pin 305f of the rotor soft magnetic member 305 abuts against one end of the guide groove 307a of the cover 307), a reverse current is caused to flow through the coil 2 to excite the outside magnetic pole portions 304a and 304b of the stator 304 into the N pole and the inside magnetic pole portion 305a of the rotor soft magnetic member 305 into the S pole. At this time, the magnet 301 starts to rotate counterclockwise. Then, the output pin 305f of the rotor soft magnetic member 305 abuts against the one end of the guide groove 307a of the cover 307, so that the magnet 301 and the rotor soft magnetic member 305 stop rotating, resulting in the state shown in FIG. 7.

As can be seen from the above, the actuator with above arrangement can reciprocatively rotates within a predetermined range (angle) by switching the direction of the current flowing through the coil 302.

According to the first embodiment, the magnet 301 has the inside magnetic pole portion 305a fixed to in its inner diameter portion, eliminating the clearance therebetween. Therefore, the distance between the outside magnetic pole portions 304a and 304b and the inside magnetic pole portion 305a becomes small, further reducing the magnetic resistance. More specifically, the distance between the outside magnetic pole portions 304a and 304b and the inside magnetic pole portion 305a becomes only the thickness of the magnet 301 and the clearance between the magnet 301 and the outside magnetic pole portions 304a and 304b, so that the distance can be reduced compared to the conventional actuator. Accordingly, a magnetic force generated from the coil 302 effectively acts on the magnet 301.

Further, the inner diameter portion of the magnet 301 is filled with the rotor soft magnetic member 305, thereby having a large mechanical strength. The rotor soft magnetic member 305 also functions as a so-called back metal for reducing the magnetic resistance between the S pole and the N pole that are generated in the inner diameter portion of the magnet 301, so that a permeance coefficient of the magnetic circuit is set high. Accordingly, even if used under a high temperature environment, the magnet 301 rarely undergoes magnetic deterioration due to demagnetization.

Further, as described above, the magnet 301 has a large mechanical strength and suppresses the magnetic deterioration, so that it becomes possible to reduce the radial thickness of the magnet 301. Accordingly, the actuator not only becomes an extremely compact actuator in terms of the diameter size, but also can be further reduced in distance between the outside magnetic pole portions 304a and 304b and the inside magnetic pole portion 305a, achieving a device with an increased output.

In other words, the actuator, which is high in output, compact, and stable in performance characteristics, can be achieved.

Further, according to the first embodiment, the magnet 301 has only to be managed in terms of the clearance of its outer diameter portion, thereby greatly facilitating assembly thereof, achieving reduction in manufacturing cost, and reducing the risk of causing defects.

Further, the magnet 301 is provided in its inside with the projection 301e for adjusting the phase of the magnet 301 with respect to the rotor soft magnetic member 305 (output pin 305f), thereby enabling easy phase adjustment with respect to the rotor soft magnetic member 305. Furthermore, if a shaft having a groove to be fitted with the projection 301e of the magnet 301 is used as a jig, it becomes possible to arrange the magnets 301 in several layers in their axial direction and collectively magnetize the magnets 301 at a time. Accordingly, working efficiency becomes greater than that in the case where the magnets 301 are magnetized one by one, thereby achieving the reduction in manufacturing cost.

The first embodiment further produces the following effects.

The magnetic flux generated by causing a current to flow through the coil 302 crosses the magnet 301 arranged between the outside magnetic pole portions 304a and 304b of the stator 304 and the inside magnetic pole portion 305a of the rotor soft magnetic member 305, resulting in effective action. Further, the outside magnetic pole portions 304a and 304b are formed into the tooth shapes that extend in parallel with the axial direction of the magnet 301 having a cylindrical shape, thereby enabling reduction in radial size. Accordingly, the actuator, which has a cylindrical shape and an extremely small diameter, can be achieved. Furthermore, the coil 302 is provided as a single part, achieving a simplified control circuit for electrification. In this respect as well, the reduction in manufacturing cost can be thereby achieved.

Second Embodiment

Figure 9:
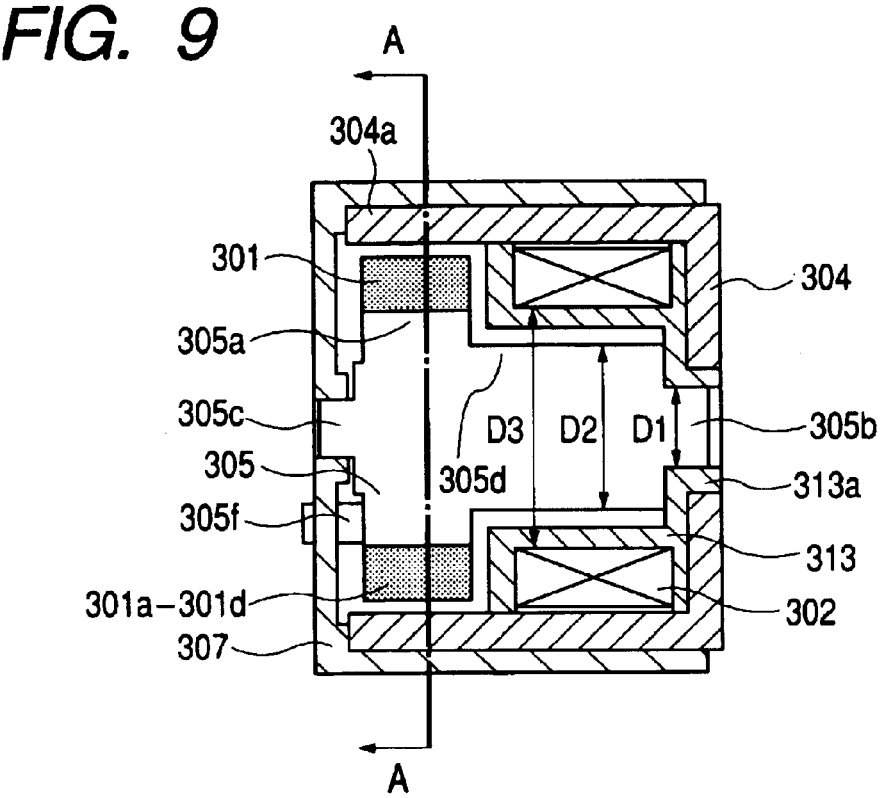
FIG. 9 is a sectional view of an actuator taken along its axial direction according to a second embodiment of the present invention.

FIG. 9 is a sectional view of an actuator taken along its axial direction according to a second embodiment of the present invention. In FIG. 9, respective structural components denoted by reference numerals 301, 302, 304, 305, and 307 have the same functions as the corresponding components of the first embodiment described above. Thus, description of those components will be omitted.

In FIG. 9, a bobbin 313 is formed of a non-magnetic material around which the coil 302 is wound. The bobbin 313 is formed of a non-conductive material, and is molded by polyacetal (POM), polyphenylene sulfide (PPS), liquid crystal polymer (LCP), etc. taking slidability into consideration.

The bobbin 313 is fixed to the stator 304, and includes a fitting portion 313a into which a shaft portion 305b of the rotor soft magnetic member 305 is fitted, so that the bobbin 313 rotatably supports the rotor soft magnetic member 305. The bobbin 313 serves as both the bobbin 303 and the bearing 306 according to the first embodiment.

In the second embodiment, the bearing 306, which is separately provided as a part for preventing reduction of torque caused by the adsorption between the rotor soft magnetic member 305 and the bearing in the first embodiment, is replaced with the bobbin 313, thereby reducing the manufacturing cost and facilitating the assembly.

According to the first and second embodiments described above, the actuator having the following effects can be obtained.

Provided that the portion of the rotor soft magnetic member 305 fixed in the inner surface of the magnet 301 and opposed to the outside magnetic pole portions 304a and 304b is called inside magnetic pole portion 305a, the magnetic flux lines generated from the coil 302 pass the region between the outside magnetic pole portions 304a and 304b opposed to the outer peripheral surface of the magnet 301 and the inside magnetic pole portion 305a of the rotor soft magnetic member 305 fixed to the inner peripheral surface of the magnet 301, thereby acting effectively on the magnet 301. At this time, there is no need to secure a clearance between the inner peripheral surface of the magnet 301 and the inside magnetic pole portion 305a opposed thereto, which is necessary for the conventional actuator. Accordingly, it is possible to reduce the distance between the outside magnetic pole portions 304a and 304b and the inside magnetic pole portion 305a, and the magnetic resistance becomes small. As a result, the output of the actuator can be enhanced.

Further, the magnet 301 has only to be managed in terms of the clearance between its outer portion and the outside magnetic pole portions 304a and 304b, thereby greatly facilitating assembly thereof, achieving reduction in manufacturing cost, and reducing the risk of causing defects, that is, allowing to secure the stable operation.

Further, the magnet 301 has the rotor soft magnetic member 305 fixed to its inner diameter portion, thereby being outstanding in its mechanical strength and capable of being reduced in thickness. Accordingly, the actuator can be expected to be reduced in size and further increased in output. In addition, the coil 302 has substantially the same outer diameter as that of the magnet 301, and is arranged in the axial direction of the magnet 301. In other words, the diameter of the actuator has only to be large enough to oppose the magnetic pole portion of the stator 304 to the diameter of magnet 301. Also, the length of the actuator in its axial direction can be set as the length obtained by adding the length of the coil 302 to that of the magnet 301. Accordingly, the actuator can be extremely reduced in diameter and size.

Further, the inner diameter of the coil 302 can be set to have a clearance in the outer diameter portion of the overlapped portion between the rotor soft magnetic member 305 and the coil 302, so that the inner diameter of the coil 302 can be further reduced compared to the conventional actuator, that is, the winding number of the coil 302 can be maximized. Accordingly, the output of the actuator can be enhanced.

Further, the magnet 301 has a large mechanical strength, and the rotor soft magnetic member 305 functions as the back metal. Accordingly, the actuator that rarely undergoes magnetic deterioration can be obtained.

In the respective embodiments described above, the example of providing two outside magnetic pole portions is shown. However, for example, the outside magnetic pole portion 304a may solely be provided, or three or more outside magnetic pole portions may be provided.

Further, in the embodiments 1 and 2, the portion formed of a soft magnetic material and arranged on an outer diameter side of the magnet 301 is set as the stator 304, the portion formed of a soft magnetic material and fixed to the inner diameter portion of the magnet 301 is set as the rotor soft magnetic member 305, and the rotor soft magnetic member 305 and the magnet 301 compose a rotor, but the structure is not limited thereto. By fixing the rotor soft magnetic material to the outer diameter portion of the magnet 301 instead of fixing the soft magnetic material to the inner diameter portion of the magnet 301, it is possible that the portion fixed to the outer diameter portion of the magnet 301 is set as a rotor soft magnetic member, the portion formed of a soft magnetic material and arranged to be opposed to the inner diameter portion of the magnet 301 is set as a stator, and the rotor soft magnetic member fixed to the outer diameter portion of the magnet 301 and the magnet 301 compose the rotor.

The magnet 301 is formed by dividing its inner peripheral surface into n parts in the peripheral direction and alternately magnetizing the n parts into S poles and N poles.

In this case, the rotor soft magnetic member may have a tooth shape or a merely cylindrical shape. Naturally, the rotor soft magnetic member is not fixed to the cover 307, but is rotatably supported by the cover 307. A projection is provided to a tip portion or an outer peripheral portion of the rotor soft magnetic member, and the guide groove 307a for regulating the moving range of the projection is provided to the cover 307. The guide groove 307a is not limited to that shown in FIGS. 5, 7, or 8, and may be provided to an appropriate portion depending on the position of the projection provided to the rotor soft magnetic member.

The stator arranged to be opposed to an inner diameter side of the magnet 301 includes n/2 inside magnetic pole portions shifted by 720/n° in the same manner as the outside magnetic pole portions 304a and 304b shown in the respective embodiments described above. The inside magnetic pole portions may be formed by setting the diameter of a portion that does not correspond to the inside magnetic pole portions of the stator to be smaller than the diameter of the portion that corresponds to the inside magnetic pole portions. As the diameter of the portion that does not corresponds to the inside magnetic pole portions decreases, the torque of the motor can is enhanced, but the strength of the stator needs to be taken into consideration for setting its shape. Note that if a portion for coupling the stator and the cover 307 is formed to have a shape unable to rotate, the phases of the stator and the cover 307 can easily be determined.

Third Embodiment

Figure 10:
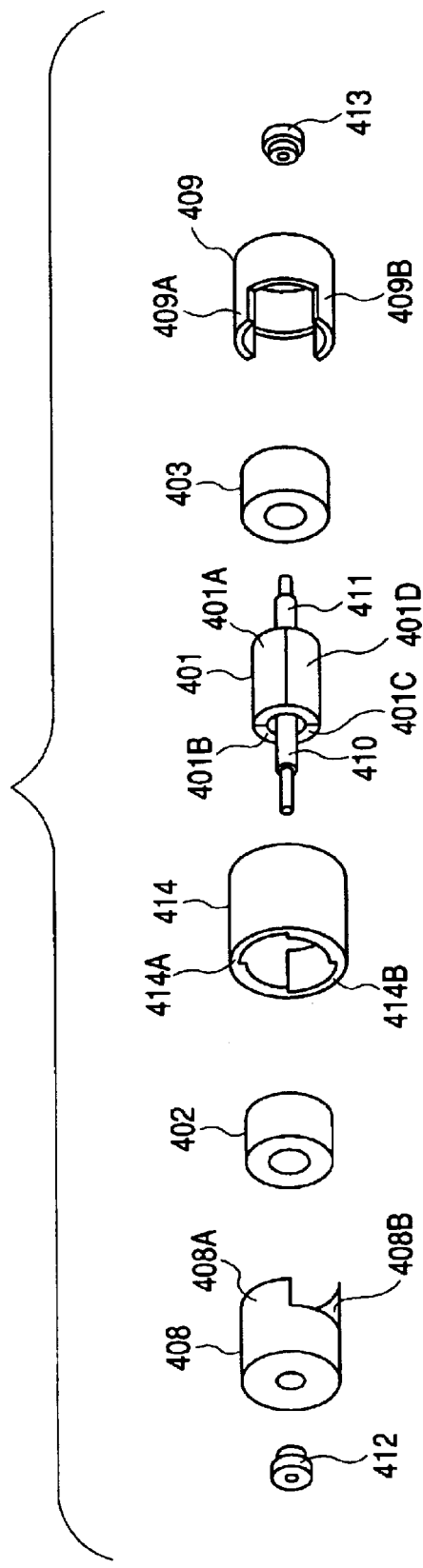
FIG. 10 is an exploded perspective view of a stepping motor according to a third embodiment of the present invention.
Figure 11:
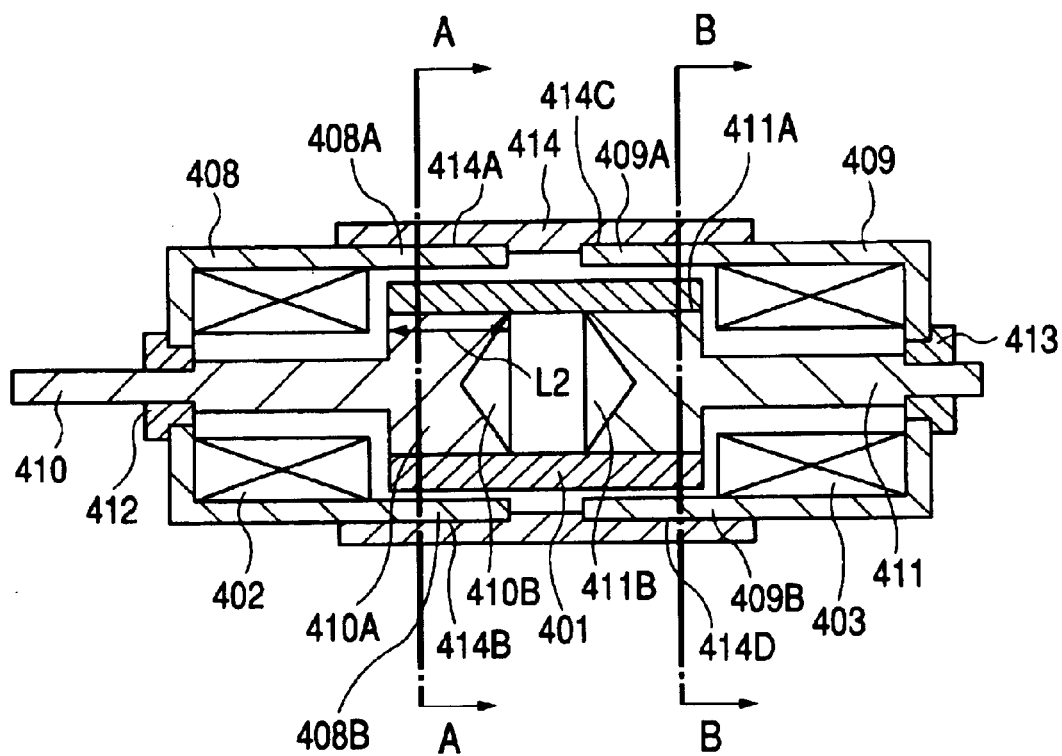
FIG. 11 is a sectional view showing a state where the stepping motor of FIG. 10 has been assembled.

FIGS. 10 to 13H are diagrams according to a third embodiment of the present invention. FIG. 10 is an exploded perspective view of a stepping motor, and FIG. 11 is a sectional view of the stepping motor of FIG. 10 taken along its axial direction after the stepping motor has been assembled.

In FIGS. 10 to 13H, a magnet ring (hereinafter, referred to simply as "magnet") 401 has a cylindrical shape and forms a rotor. The magnet 401 serving as the rotor has its outer peripheral surface divided into n parts (where n is an even number and is 4 in this embodiment) at regular intervals in the peripheral direction, and includes magnetic portions 401A, 401B, 401C, and 401D that are alternately magnetized into S poles and N poles. The outer peripheral surfaces of the magnetic portions 401A and 401C are the S poles, and the inner peripheral surfaces of the magnetic portions 401B and 401D are the N poles. The magnet 401 is composed of a plastic magnet formed by injection molding, and is small in size because of its simple shape. Thus, it is easy to form the magnet 401 into a thin structure. Also, the assembly by press-fitting causes no cracking.

A first coil 402 has a cylindrical shape, and a second coil 403 has a cylindrical shape as well. The first coil 402 and the second coil 403 have their central portions arranged on the coincide line with respect to the central portion of the magnet 401, and are arranged along the axial direction so as to sandwich the magnet 401. The outer diameters of the first coil 402 and the second coil 403 are substantially the same as the outer diameter of the magnet 401.

A first stator 408 and a second stator 409 are each formed of a soft magnetic material, and each include an external cylindrical portion having a cylindrical shape. The first stator 408 includes first outside magnetic pole portions 408A and 408B that each have a comb tooth shape and are opposed to the outer peripheral surface of the magnet 401 so as to have a predetermined clearance therebetween. The first outside magnetic pole portions 408A and 408B are obtained by cutting out the tip portion of the external cylindrical portion of the first stator 408 having a cylindrical shape so as to be divided into multiple parts in its peripheral direction, and are each formed of a magnetic pole having a comb tooth shape that extends in the axial direction. The first outside magnetic pole portions 408A and 408B are formed so as to be shifted by 360/(n/2)°, that is, 180°. The second stator 409 similarly includes second outside magnetic pole portions 409A and 409B that each have a comb tooth shape and are opposed to the outer peripheral surface of the magnet 401 so as to have a predetermined clearance therebetween. The second outside magnetic pole portions 409A and 409B are obtained by cutting out the tip portion of the external cylindrical portion of the second stator 409 having a cylindrical shape so as to be divided into multiple parts in its peripheral direction, and are each formed of a magnetic pole having a comb tooth shape that extends in the axial direction. The second outside magnetic pole portions 409A and 409B are formed so as to be shifted by 360/(n/2)°, that is, 180°.

Both the first outside magnetic pole portions 408A and 408B of the first stator 408 and the second outside magnetic pole portions 409A and 409B of the second stator 409 include notches and teeth extending in parallel to the axis. With this arrangement, the magnetic pole portions can be formed with the diameter of the stepping motor being kept minimized. In other word, if the outside magnetic pole portions are formed of a convexo-concave shape extending in a radial direction, the diameter of the stepping motor becomes larger by the extended length, but in the third embodiment, the outside magnetic pole portions include the notches and the teeth extending in parallel to the axis, so that the diameter of the stepping motor can be minimized.

Both the first outside magnetic pole portions 408A and 408B of the first stator 408 and the second outside magnetic pole portions 409A and 409B of the second stator 409 have the same shape, in which the tip portions of the magnetic pole portions each having the comb tooth shape are arranged to be opposed to each other. Further, the first stator 408 and the second stator 409 are arranged with the phases of their comb-tooth-shaped magnetic pole portions being shifted by 180/n°, that is, 45°. The first stator 408 is excited by the first coil 402, and the second stator 409 is excited by the second coil 403.

A first shaft 410 formed of a soft magnetic material serves as an output shaft. The first shaft 410 is inserted into an inner diameter portion of the first coil 402, and fixed to an inner diameter portion of the magnet 401. A first inside magnetic pole portion 410A is formed in such a position as to sandwich the magnet 401 with the first outside magnetic pole portions 408A and 408B of the first stator 408 that are opposed to the magnet 401. The first inside magnetic pole portion 410A of the first shaft 410 is excited by the first coil 402 into the opposite polarity to the polarity applied to the first outside magnetic pole portions 408A and 408B of the first stator 408.

Figure 12:
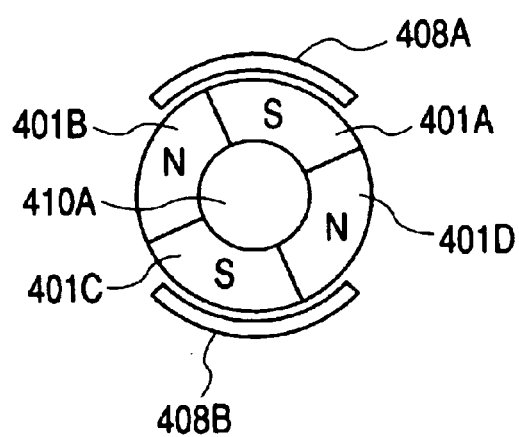
FIG. 12 is a sectional view of the stepping motor of FIG. 11 viewed from a direction perpendicular to an axis of a rotor of the stepping motor.

As shown in FIG. 12, a sectional shape of the first inside magnetic pole portion 410A of the first shaft 410 taken along a direction perpendicular to the axis thereof is the same as a cross-sectional shape of a column.

Reference numeral 411 denotes a second shaft formed of a soft magnetic material. The second shaft 411 is inserted into an inner diameter portion of the second coil 403, and fixed to an inner diameter portion of the magnet 401. A second inside magnetic pole portion 411A is formed in such a position as to sandwich the magnet 401 with the second outside magnetic pole portions 409A and 409B of the second stator 409 that are opposed to the magnet 401. As shown in FIG. 11, an end surface of the first shaft 410 on a first inside magnetic pole portion 410A side and an end surface of the second shaft 411 on a second inside magnetic pole portion 411A side are arranged so as to oppose each other and do not contact each other.

The second inside magnetic pole portion 411A of the second shaft 411 is excited by the second coil 403 into the opposite polarity to the polarity applied to the second outside magnetic pole portions 409A and 409B of the second stator 409. Similarly to the first inside magnetic pole portion 410A of the first shaft 410, a sectional shape of the second inside magnetic pole portion 411A of the second shaft 411 taken along a direction perpendicular to the axis thereof is the same as the cross-sectional shape of a column.

The first shaft 410 and the second shaft 411 are fixed via the magnet 401. However, since the magnet 401 is not formed of a soft magnetic material, even in the case where the first shaft 410 is excited by the first coil 402, the excitation does not cause synchronous excitation of the second shaft 411. Also, even in the opposite case where the second shaft 411 is excited by the second coil 403, the excitation does not cause synchronous excitation of the first shaft 410.

The first shaft 410 and the second shaft 411 are structured so as not to directly contact each other and not to be connected via a soft magnetic member. In this structure, the magnetic flux lines do not pass the region between the first shaft 410 and the second shaft 411. Also, the first shaft 410 and the second shaft 411 respectively have concave portions 410B and 411B formed on an end surface of the first inside magnetic pole portion 410A and an end surface of the second inside magnetic pole portion 411A that are opposed to each other, so that the magnetic resistance between the first shaft 410 and the second shaft 411 increase. Also in this case, areas where the first inside magnetic pole portion 410A of the first shaft 410 is opposed to the first outside magnetic pole portions 408A and 408B of the first stator 408 are not reduced, so that the magnetic resistance between the first inside magnetic pole portion 410A of the first shaft 410 and the first outside magnetic pole portions 408A and 408B of the first stator 408 does not increase. Similarly, areas where the second inside magnetic pole portion 411A of the second shaft 411 is opposed to the second outside magnetic pole portions 409A and 409B of the second stator 409 are not reduced, so that the magnetic resistance between the second inside magnetic pole portion 411A of the second shaft 411 and the second outside magnetic pole portions 409A and 409B of the second stator 409 does not increase.

The concave portions 410B and 411B desirably have a conical shape in order to secure the condition of the magnetic resistance (under which the magnetic resistance increases). In the third embodiment, the concave portions 410B and 411B have a conical shape. By employing a method in which an adhesive is injected into the conical-shaped concave portions 410B and 411B to fix the magnet 401, the first shaft 410, and the second shaft 411 to one another, a sufficient amount of adhesive can be used, thereby enhancing the fixation strength. In addition, because of the conical shape, the adhesive can be prevented from leaking out, contacting a stator or a coil, for example, and causing a defect, thereby facilitating the assembly.

A first bearing 412 formed of a non-magnetic material is fixed to the first stator 408, and rotatably supports the first shaft 410. Similarly, a second bearing 413 formed of a non-magnetic material is fixed to the second stator 409, and rotatably supports the second shaft 411. Since the first bearing 412 and the second bearing 413 are each formed of a non-magnetic material, it is possible that the adsorption due to the magnetic force generated between the first stator 408 and the first shaft 410 and the adsorption due to the magnetic force generated between the second stator 409 and the second shaft 411 are prevented, and their rotational characteristics and durability can be enhanced.

Note that the first bearing 412 and the second bearing 413 may be formed of a soft magnetic material. In that case, the magnetic resistance of the magnetic circuit becomes small, and the generated torque itself becomes large. Naturally, an adsorption force may possibly be generated between the first bearing 412 and the first shaft 410 or between the second bearing 413 and the second shaft 411 to cause a torque loss due to a frictional force or impair durability of sliding surfaces. However, by subjecting a surface of the first bearing 412, first shaft 410, the second bearing 413, or the second shaft 411 to application of a lubricant, lubricant coating (fluorine-based lubricant coating, graphite-based lubricant coating, molybdenum disulfide-based lubricant coating, or the like), lubricant plating (for example, plating of electroless nickel containing polytetrafluoro-ethylene (PTFE) particles, electroless nickel plating using a Teflon (registered trademark) lubricant, or the like), or the like, the torque loss due to the friction between the sliding surfaces can be suppressed, the impairment of the durability of sliding surfaces can be prevented, and the stepping motor having a large output torque can be achieved.

The first coil 402 is arranged between the external cylindrical portion of the first stator 408 and the first shaft 410 and in the vicinity of a coupling portion disposed via the first bearing 412, such that one end side (the first coil 402 side) of the magnet 401 is sandwiched between the first outside magnetic pole portions 408A and 408B of the first stator 408 and the first inside magnetic pole portion 410A of the first shaft 410. The second coil 403 is arranged between the external cylindrical portion of the second stator 409 and the second shaft 411 and in the vicinity of a coupling portion disposed via the second bearing 413, such that the other end side (the second coil 403 side) of the magnet 401 is sandwiched between the second outside magnetic pole portions 409A and 409B of the second stator 409 and the second inside magnetic pole portion 411A of the second shaft 411. In other words, the first outside magnetic pole portions 408A and 408B and the second outside magnetic pole portions 409A and 409B are opposed to the outer peripheral surface of the magnet 401, the first inside magnetic pole portion 410A and the second inside magnetic pole portion 411A are located on the inner peripheral surface of the magnet 401, the first outside magnetic pole portions 408A and 408B are opposed to the first inside magnetic pole portion 410A, and the second outside magnetic pole portions 409A and 409B are opposed to the second inside magnetic pole portion 411A.

A coupling ring 414 formed of a cylindrical shape includes grooves 414A and 414B formed on one end side of an inside portion of the coupling ring 414 and grooves 414C and 414D formed on the other end side thereof. The phase of the grooves 414C and 414D and the phase of the grooves 414A and 414B are shifted by 180/n°, that is, 45°. The grooves 414A and 414B and the grooves 414C and 414D are formed so as to have a predetermined distance therebetween.

The first outside magnetic pole portions 408A and 408B and the second outside magnetic pole portions 409A and 409B are fitted into the grooves 414A and 414B and the grooves 414C and 414D, respectively, to be fixed by an adhesive or the like.

By fixing the first stator 408 and the second stator 409 to the coupling ring 414 as described above, the first stator 408 and the second stator 409 can be arranged into desired positions and phases. Also, the coupling ring 414 is formed of a non-magnetic material, so that the magnetic circuit can be separated by a region between the first stator 408 and the second stator 409, making it difficult for the magnetic poles to affect each other.

According to the third embodiment, the inner diameter portion of the magnet 401 is filled with the first shaft 410 and the second shaft 411, thereby having a larger mechanical strength than that of the stepping motor proposed in Japanese Patent Application Laid-open No. H09-331666 or that of the stepping motor proposed in Japanese Patent Application Laid-open No. H10-229670. The first shaft 410 and the second shaft 411 also function as so-called back metals for reducing the magnetic resistance between the S pole and the N pole that are generated in the inner diameter portion of the magnet 401, so that a permeance coefficient of the magnetic circuit is set high. Accordingly, even if used under a high temperature environment, the magnet 401 rarely undergoes magnetic deterioration due to demagnetization.

The external cylindrical portions of the first stator 408 and the second stator 409 have a cylindrical shape, thereby facilitating the assembly. If the stepping motor is structured as in the same manner as described above in the section of "Related Background Art", each of the first stator and the second stator needs to have its inside magnetic pole portions formed integrally with the outside magnetic pole portions, and it is difficult to structure the inside magnetic pole portions and the outside magnetic pole portions as a unitary part in terms of manufacturing processes. For example, it takes higher cost to mold the part by metal injection molding. It also becomes more difficult to unitarily manufacture the part by pressing as the part becomes smaller in size, which is more prominently observed than the case of manufacturing a part forming the outside magnetic pole portion. Further, in the case where the inside magnetic pole portions and the outside magnetic pole portions are separately manufactured and then integrally fixed to one another by caulking, welding, bonding, etc., the manufacturing cost increases.

In other words, the conventional stepping motor needs at least nine parts in total (two coils, a magnet, an output shaft, a first stator composed of two parts for forming outside magnetic pole portions and inside magnetic pole portions, a second stator composed of two parts for forming outside magnetic pole portions and inside magnetic pole portions, and a coupling ring), while the stepping motor according to the third embodiment can be structured by eight parts in total (two coils, a magnet, two output shafts, a first stator composed of a part for forming outside magnetic pole portions, a second stator composed of a part for forming outside magnetic pole portions, and a coupling ring), thereby reducing the manufacturing cost and facilitating the manufacture.

Further, the conventional stepping motor needs to be assembled while maintaining the precision of the clearances between the outer diameter portion of the magnet and the outside magnetic pole portions. Moreover, the inside magnetic pole portions and the magnet need to be arranged so as to have a predetermined clearance therebetween, so that the predetermined clearance may not be secured due to the variation of parts precision or the lack of assembly precision, increasing the risk of causing a defect that an inside magnetic pole portion contacts the magnet, or the like. On the contrary, according to the third embodiment, the magnet has only to be managed in terms of the clearance of its outer diameter portion, thereby facilitating the manufacture.

Figure 1:
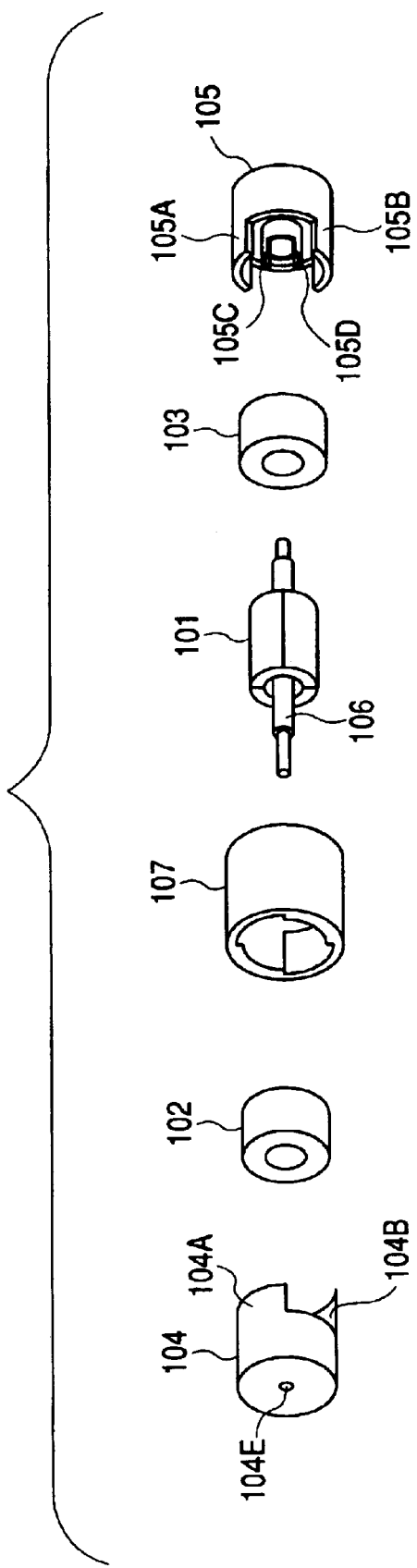
FIG. 1 is an exploded perspective view of a conventional stepping motor.
Figure 2:
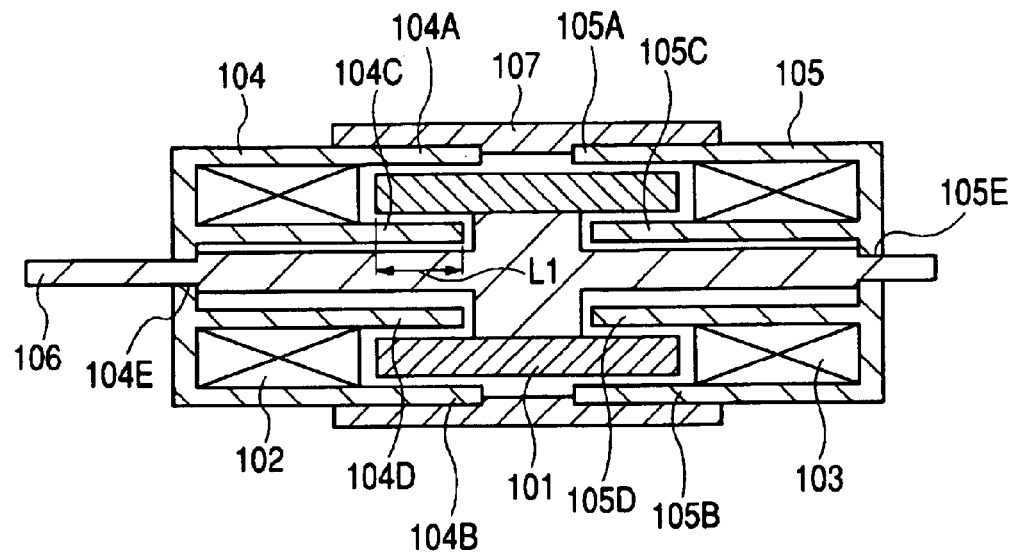
FIG. 2 is a sectional view showing a state where the stepping motor of FIG. 1 has been assembled.
Figure 3:
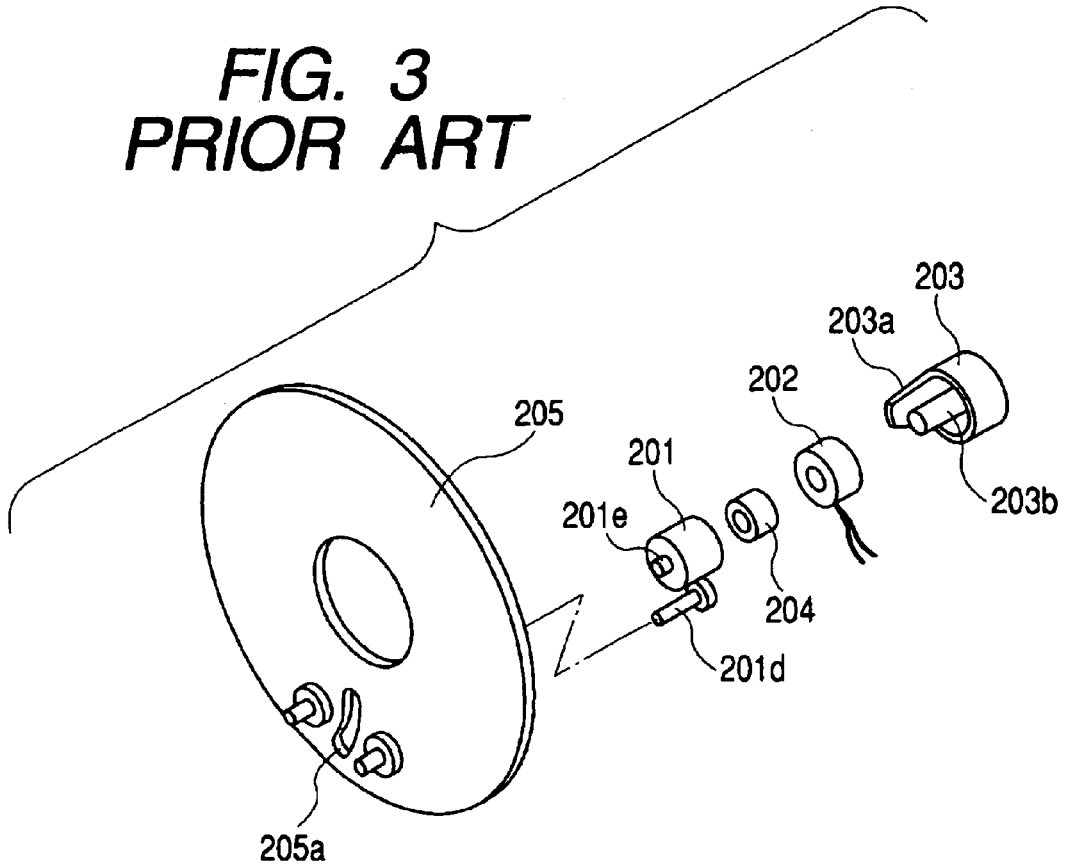
FIG. 3 is an exploded perspective view of another conventional actuator.
Figure 4:
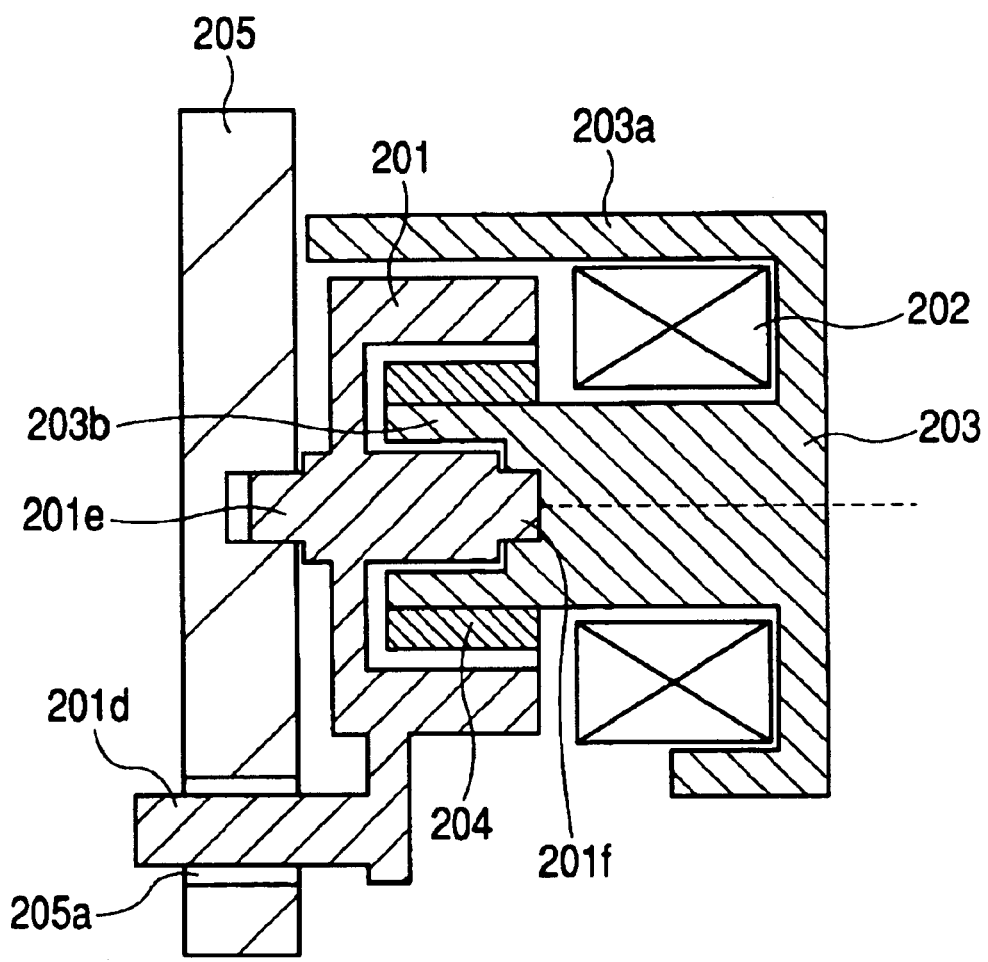
FIG. 4 is a sectional view of the actuator of FIG. 3 taken along its axial direction after the stepping motor has been assembled.

Further, the conventional stepping motor needs to be structured such that the inside magnetic pole portions do not contact a portion where the magnet and the output shaft are connected, making it impossible to secure a sufficient length for the axial length (indicated by L1 of FIG. 2) of a region where the inside magnetic pole portions and the magnet are opposed to each other. On the contrary, according to the third embodiment, as indicated by L2 of FIG. 11, the sufficient length can easily be secured for the axial length of the region where the inside magnetic pole portions and the magnet are opposed to each other. Accordingly, the outside magnetic pole portions and the magnet can be put to effective use, and the output of the stepping motor can be enhanced.

FIGS. 13A to 13H are sectional views taken along a line A—A of FIG. 11 and sectional views taken along a line B—B of FIG. 11, which will be used to explain rotation drives of the stepping motor.

FIGS. 13A and 13E are the sectional views obtained at the same point in time, FIGS. 13B and 13F are the sectional views obtained at the same point in time, FIGS. 13C and 13G are the sectional views obtained at the same point in time, and FIGS. 13D and 13H are the sectional views obtained at the same point in time.

In a state shown in FIGS. 13A and 13E, when currents are caused to flow through the first coil 402 and the second coil 403 to excite the first outside magnetic pole portions 408A and 408B of the first stator 408 into the N poles and the second outside magnetic pole portions 409A and 409B of the second stator 409 into the S poles, the magnet 401 serving as a rotor is rotated counterclockwise by 45°, resulting in the state shown in FIGS. 13B and 13F. Then, when the direction of the current flowing through the first coil 402 is reversed to excite the first outside magnetic pole portions 408A and 408B of the first stator 408 into the S poles and the second outside magnetic pole portions 409A and 409B of the second stator 409 into the S poles, the magnet 401 serving as a rotor is further rotated counterclockwise by 45°, resulting in the state shown in FIGS. 13C and 13G. After that, when the direction of the current flowing through the second coil 403 is reversed to excite the first outside magnetic pole portions 408A and 408B of the first stator 408 into the S poles and the second outside magnetic pole portions 409A and 409B of the second stator 409 into the N poles, the magnet 401 serving as a rotor is further rotated counterclockwise by 45°, resulting in the state shown in FIGS. 13D and 13H.

From then on, by switching the directions of the currents flowing through the first coil 402 and the second coil 403 in order, the magnet 401 serving as a rotor is rotated to reach a position corresponding to the phase defined by the flowing currents.

Further, two magnetic layers that are each obtained by dividing the outer peripheral surface of the magnet 401 may be provided in the axial direction, such that the phases of one magnetic layer opposed to the first stator 408 and the other magnetic layer opposed to the second stator 409 are shifted by 180/n°, and the phases of the first stator 408 and the second stator 409 coincide with each other.

According to the third embodiment, the magnetic flux lines generated from the coils are adapted to act directly on the magnet, thereby enabling the stepping motor to obtain an increased output and to be reduced in size. In other words, the diameter of the stepping motor has only to be large enough to oppose the magnetic pole of the stator to the diameter of the magnet. Also, the axial length of the stepping motor has only to be the same as the length obtained by adding the length of the first coil to that of the second coil. Accordingly, since the size of the stepping motor is determined by the diameters and the axial lengths of the magnet and the coils, if the diameters and the axial lengths of the magnet and the coils are extremely reduced, the stepping motor can be microminiaturized.

At this time, if the diameters and the axial lengths of the magnet and the coils are extremely reduced, it becomes difficult to maintain the precision of the stepping motor. However, the problem with the precision of the stepping motor is solved by the simple structure in which the magnet is formed into a hollow cylindrical shape, and the outside magnetic pole portions and the inside magnetic pole portions of the first stator and the second stator are opposed to the outer peripheral surface and the inner peripheral surface of the magnet formed into a hollow cylindrical shape. Further, as described above, the stepping motor with reduced manufacturing cost and an increased output can be achieved.

Fourth Embodiment

Figure 14:
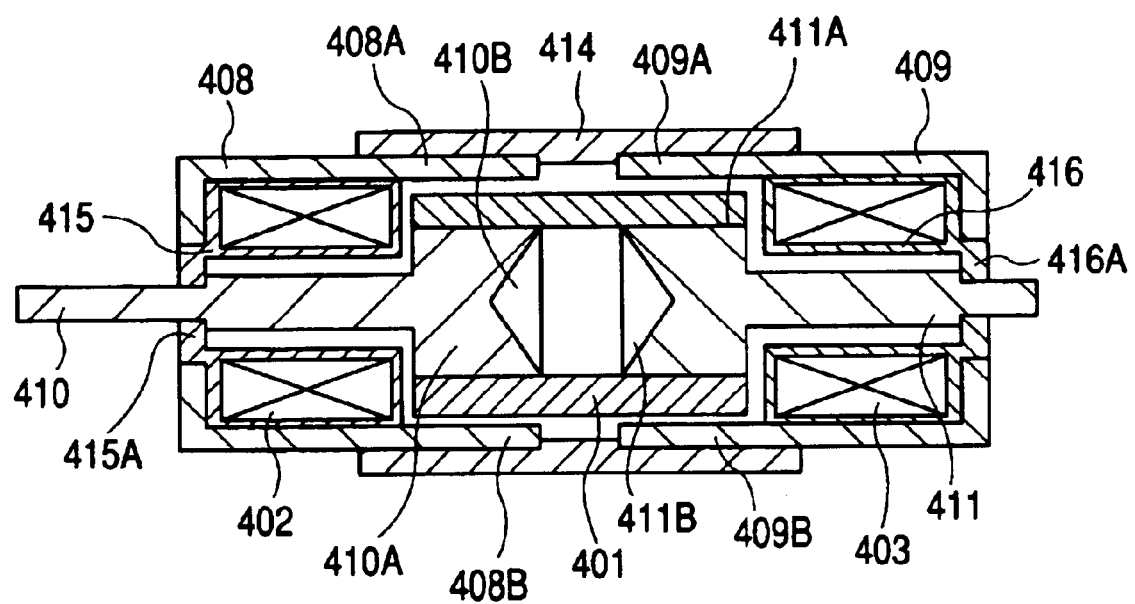
FIG. 14 is a sectional view of a stepping motor taken along its axial direction according to a fourth embodiment of the present invention.

FIG. 14 is a sectional view of a stepping motor according to a fourth embodiment of the present invention. The same structural components as those of the third embodiment are denoted by the same symbols. Thus, description of those components will be omitted.

In FIG. 14, the first coil 402 is wound in a first bobbin 415. The first bobbin 415 is formed of a non-magnetic, non-conductive material so as not to cause an unnecessary continuity between the first coil 402 and the first stator 408. The first bobbin 415 is fixed to the first stator 408, and includes a hole 415A at which the first shaft 410 is rotatably supported and which functions similarly as the first bearing 412 of the third embodiment.

Reference numeral 416 denotes a second bobbin, and the second coil 403 is wound in the second bobbin 416. The second bobbin 416 is also formed of a non-magnetic, non-conductive material so as not to cause an unnecessary continuity between the second coil 403 and the second stator 409. The second bobbin 416 is fixed to the second stator 409, and includes a hole 416A at which the second shaft 411 is rotatably supported and which functions similarly as the second bearing 413 of the third embodiment.

According to the fourth embodiment, the unnecessary continuity is prevented between the first coil 402 and the first stator 408, while a member for preventing the adsorption between the first stator 408 and the first shaft 410 is formed of a single part, that is, the first bobbin 415, thereby achieving the structure that is assembled with ease and with reduced cost and allows a stable operation. Similarly, the unnecessary continuity is prevented between the second coil 403 and the second stator 409, while a member for preventing the adsorption between the second stator 409 and the second shaft 411 is formed of a single part, that is, the second bobbin 416, thereby achieving the structure that is assembled with ease and with reduced cost and allows a stable operation.

According to the embodiments 3 and 4, provided that the portion of the first shaft 410, which is opposed to the first outside magnetic pole portions 408A and 408B and fixed to the inner peripheral surface of the magnet 401, is called the first inside magnetic pole portion 410A, the magnetic flux lines generated from the first coil 402 pass the region between the first outside magnetic pole portions 408A and 408B opposed to the outer peripheral surface of the magnet 401 and the first inside magnetic pole portion 410A fixed to the inner peripheral surface of the magnet 401, thereby acting effectively on the magnet 401. At this time, there is no need to secure a clearance between the inner peripheral surface of the magnet 401 and the first inside magnetic pole portion 410A opposed thereto. Accordingly, it is possible to reduce the distance between the first outside magnetic pole portions 408A and 408B and the first inside magnetic pole portion 410A, reduce the magnetic resistance, and enhance the output.

Similarly to the above, provided that the portion of the second shaft 411, which is opposed to the first outside magnetic pole portions 409A and 409B and fixed to the inner peripheral surface of the magnet 401, is called the second inside magnetic pole portion 411A, the magnetic flux lines generated from the second coil 402 pass the region between the second outside magnetic pole portions 409A and 409B opposed to the outer peripheral surface of the magnet 401 and the first inside magnetic pole portion 411A fixed to the inner peripheral surface of the magnet 401, thereby acting effectively on the magnet 401. At this time, there is no need to secure a clearance between the inner peripheral surface of the magnet 401 and the second inside magnetic pole portion 411A opposed thereto. Accordingly, it is possible to reduce the distance between the outside magnetic pole portions 409A and 409B and the inside magnetic pole portion 411A, reduce the magnetic resistance, and enhance the output.

Further, the first inside magnetic pole portion 410A is included in the first shaft 410, and the second inside magnetic pole portion 411A is included in the second shaft 411, thereby allowing the manufacture with ease and with reduced cost.

Further, the magnet 401 has the first shaft 410 and the second shaft 411 fixed to its inner diameter portion, thereby being outstanding in its mechanical strength.

In other words, the stepping motor has a small number of the structural parts, and is composed of the parts easy for manufacture. Also, the first inside magnetic pole portion 410A and the second inside magnetic pole portion 411A can be formed to have a large length. Accordingly, the first outside magnetic pole portions 408A and 408B, the second outside magnetic pole portions 409A and 409B, and the magnet 401 can be put to effective use, and the output of the stepping motor can be enhanced. In addition, the magnet 401 has only to be managed in terms of the clearance of its outer diameter portion with respect to the first outside magnetic pole portions 408A and 408B and the second outside magnetic pole portions 409A and 409B, thereby facilitating the assembly. Further, the mechanical strength of the magnet 401 increases, and the first shaft 410 and the second shaft 411 functions as the back metals. Accordingly, the stepping motor rarely undergoes magnetic deterioration.

Further, the first coil 402 and the second coil 403 have substantially the same diameter as the magnet 401, and are arranged so as to axially sandwich the magnet 401. Accordingly, the outer diameter size of the stepping motor can be reduced.

Fifth Embodiment

Figure 15:
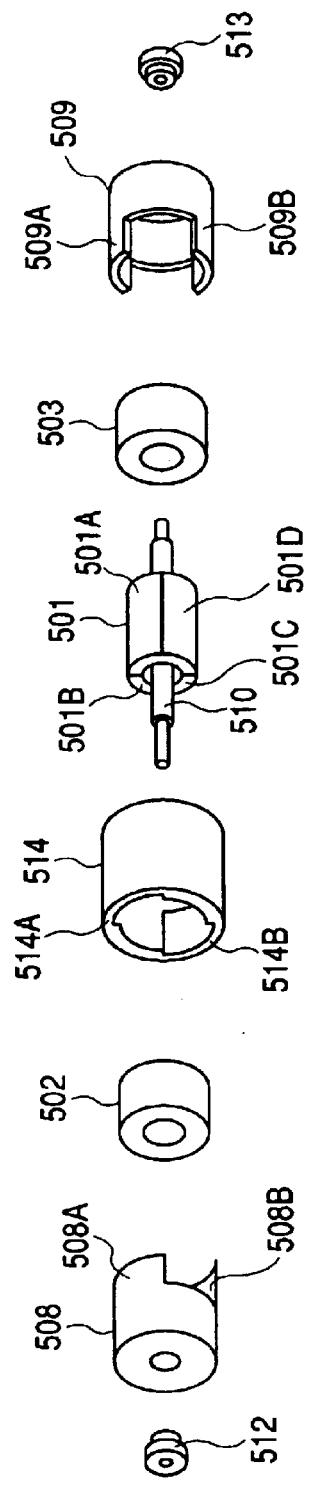
FIG. 15 is an exploded perspective view of a stepping motor according to a fifth embodiment of the present invention.
Figure 16:
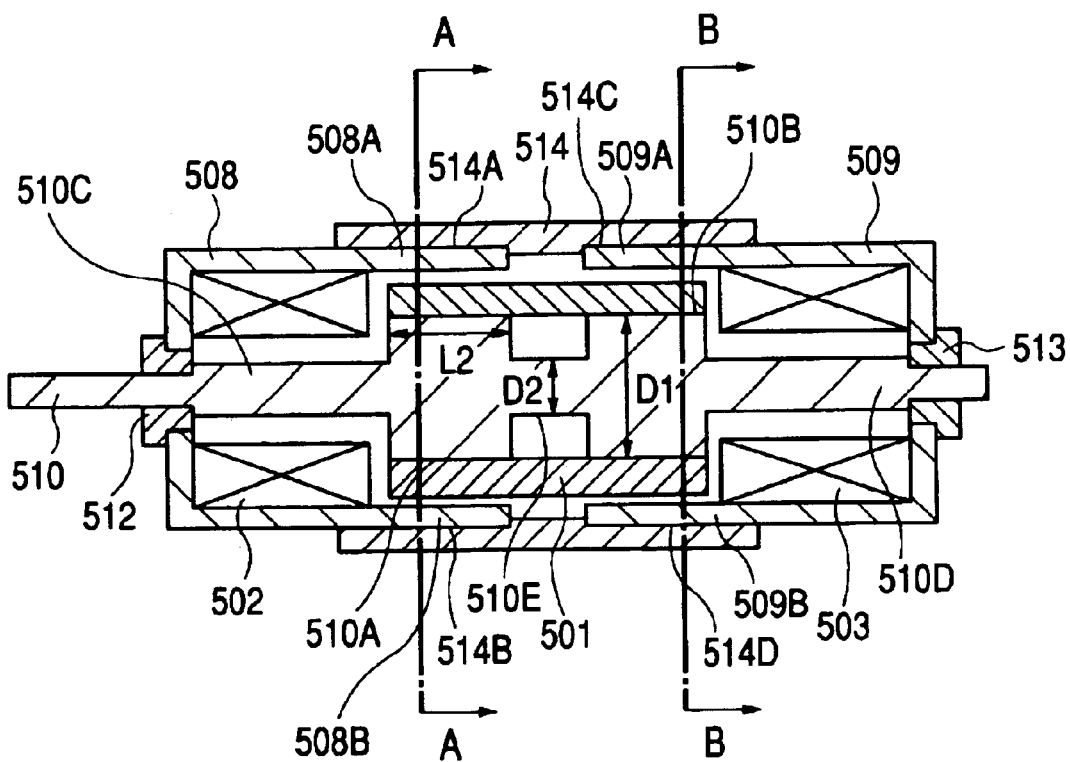
FIG. 16 is a sectional view showing a state where the stepping motor of FIG. 15 has been assembled.

FIGS. 15 to 18H are diagrams according to a fifth embodiment of the present invention. FIG. 15 is an exploded perspective view of a stepping motor, and FIG. 16 is a sectional view of the stepping motor of FIG. 15 taken along its axial direction after the stepping motor has been assembled.

In FIGS. 15 to 18H, a magnet ring (hereinafter, referred to simply as "magnet") 501 has a cylindrical shape and forms a rotor. The magnet ring 501 serving as the rotor has its outer peripheral surface divided into n parts (where n is an even number and is 4 in this embodiment) at regular intervals in the peripheral direction, and includes magnetic portions 501A, 501B, 501C, and 501D that are alternately magnetized into S poles and N poles. The outer peripheral surfaces of the magnetic portions 501A and 501C are the S poles, and the inner peripheral surfaces of the magnetic portions 501B and 501D are the N poles. The magnet ring 501 is composed of a plastic magnet formed by injection molding, and is small in size because of its simple shape. Thus, it is easy to form the magnet ring 501 into a thin structure. Also, the assembly by press-fitting causes no cracking. A first coil 2 has a cylindrical shape, and a second coil 3 has a cylindrical shape as well. The first coil 2 and the second coil 3 have their central portions arranged on the coincide line with respect to the central portion of the magnet ring 501, and are arranged along the axial direction so as to sandwich the magnet ring 501. The outer diameters of the first coil 502 and the second coil 503 are substantially the same as the outer diameter of the magnet ring 501.

A first stator 508 and a second stator 509 are each formed of a soft magnetic material, and each include an external cylindrical portion having a cylindrical shape. The first stator 508 includes first outside magnetic pole portions 508A and 508B that each have a comb tooth shape and are opposed to the outer peripheral surface of the magnet ring 501 so as to have a predetermined clearance therebetween. The first outside magnetic pole portions 508A and 508B are obtained by cutting out the tip portion of the external cylindrical portion of the first stator 508 having a cylindrical shape so as to be divided into multiple parts in its peripheral direction, and are each formed of a magnetic pole having a comb tooth shape that extends in the axial direction from one end face of the magnetic ring 501. The first outside magnetic pole portions 508A and 508B are formed so as to be shifted by 360/(n/2)°, that is, 180°. The second stator 509 similarly includes second outside magnetic pole portions 509A and 509B that each have a comb tooth shape and are opposed to the outer peripheral surface of the magnet ring 501 so as to have a predetermined clearance therebetween. The second outside magnetic pole portions 509A and 509B are obtained by cutting out the tip portion of the external cylindrical portion of the second stator 509 having a cylindrical shape so as to be divided into multiple parts in its peripheral direction, and are each formed of a magnetic pole having a comb tooth shape that extends in the axial direction from the other end face of the magnet ring that is different from that used for the first stator 508. The second outside magnetic pole portions 509A and 509B are formed so as to be shifted by 360/(n/2)°, that is, 180°.

Both the first outside magnetic pole portions 508A and 508B of the first stator 508 and the second outside magnetic pole portions 509A and 509B of the second stator 509 include notches and teeth extending in parallel to the axis. With this arrangement, the magnetic pole portions can be formed with the diameter of the stepping motor being kept minimized. In other word, if the outside magnetic pole portions are formed of a convexo-concave shape extending in a radial direction, the diameter of the stepping motor becomes larger by the extended length, but in the third embodiment, the outside magnetic pole portions include the notches and the teeth extending in parallel to the axis, so that the diameter of the stepping motor can be minimized.

Both the first outside magnetic pole portions 508A and 508B of the first stator 508 and the second outside magnetic pole portions 509A and 509B of the second stator 509 have the same shape, in which the tip portions of the magnetic pole portions each having the comb tooth shape are arranged to be opposed to each other. Further, the first stator 508 and the second stator 509 are arranged with the phases of their comb-tooth-shaped magnetic pole portions being shifted by 180/n°, that is, 45°. The first stator 508 is excited by the first coil 502, and the second stator 509 is excited by the second coil 503.

Figure 17:
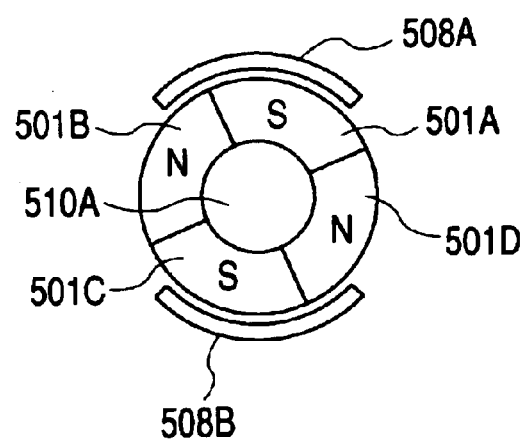
FIG. 17 is a sectional view of the stepping motor of FIG. 16 viewed from a direction perpendicular to an axis of a rotor of the stepping motor.

A rotation shaft 510 formed of a soft magnetic material is fixed to the inner peripheral portion of the magnet ring 501. In an axial range in which the magnet ring 501 is opposed to the first outside magnetic pole portions 508A and 508B of the first stator 508, a first inside magnetic pole portion 510A having an outer diameter size of D1 of FIG. 16 is formed so as to sandwich the magnet ring 501 with the first outside magnetic pole portions 508A and 508B. The rotation shaft 510 has a portion 510C inserted into the inner diameter portion of the first coil 502, and the first inside magnetic pole portion 510A is excited by the first coil 502 into the opposite polarity to the polarity applied to the first outside magnetic pole portions 508A and 508B of the first stator 508. As shown in FIG. 17, a sectional shape of the first inside magnetic pole portion 510A of the rotation shaft 510 taken along a direction perpendicular to the axis thereof is the same as the cross-sectional shape of a column. In an axial range in which the magnet ring 501 is opposed to the second outside magnetic pole portions 509A and 509B of the second stator 509, a second inside magnetic pole portion 510B having an outer diameter size of D1 of FIG. 16 is formed so as to sandwich the magnet ring 501 with the second outside magnetic pole portions 509A and 509B. The rotation shaft 510 has a portion 510D inserted into the inner diameter portion of the second coil 503, and the second inside magnetic pole portion 510B is excited by the second coil 503 into the opposite polarity to the polarity applied to the second outside magnetic pole portions 509A and 509B of the second stator 509. Similarly to the first inside magnetic pole portion 510A, a sectional shape of the first inside magnetic pole portion 510A of the rotation shaft 510 taken along the direction perpendicular to the axis thereof is the same as the cross-sectional shape of a column. The magnet ring 501 is fixed to the rotation shaft 510 via the first inside magnetic pole portion 510A and the second inside magnetic pole portion 510B.

Further, a groove 510E having a diameter size of D2 of FIG. 16 is formed between the first inside magnetic pole portion 510A and the second inside magnetic pole portion 510B. Naturally, D1 is larger than D2. Because of the small diameter of D2, the first inside magnetic pole portion 510A and the second inside magnetic pole portion 510B can be arranged so as to have a large magnetic resistance therebetween. As a result, it can be prevented that the magnetic flux lines generated by causing a current through the first coil 502 adversely affect the second coil 503, the second outside magnetic pole portions 509A and 509B, and the second inside magnetic pole portion 510B via an output shaft formed of a soft magnetic material, and the magnetic flux lines generated by causing a current through the second coil 503 adversely affect the first coil 502, the first outside magnetic pole portions 508A and 508B, and the first inside magnetic pole portion 510A via the output shaft formed of a soft magnetic material, which may cause unstable rotation. Note that even if D1=D2, as described later, the structure is advantageous in that: the mechanical strength of the magnet is increased; the permeance coefficient of the magnetic circuit is set high due to the function as a back metal, and even if used under a high temperature environment, the magnet rarely undergoes magnetic deterioration due to demagnetization; the first stator 508 and the second stator 509 can be formed into a simple cup-like shape with notches being provided to its cylindrical portion, facilitating the manufacture and the assembly; the sufficient length can easily be secured in the axial range in which the inside magnetic pole portion and the magnet are opposed to each other, enhancing the output of the stepping motor; and the like. That is, even if the groove 510E is not formed such that D1 is larger than D2, the structure is sufficiently advantageous compared with the conventional structure.

A first bearing 512 formed of a non-magnetic material is fixed to the first stator 508, and rotatably supports the rotation shaft 510. Similarly, a second bearing 513 formed of a non-magnetic material is fixed to the second stator 509, and rotatably supports the rotation shaft 510. Since the first bearing 512 and the second bearing 513 are each formed of a non-magnetic material, it is possible that the adsorption due to the magnetic force generated between the first stator 508 and the rotation shaft 510 and the adsorption due to the magnetic force generated between the second stator 509 and the rotation shaft 510 are prevented, and their rotational characteristics and durability can be enhanced.

The first bearing 512 and the second bearing 513 may be formed of a soft magnetic material. In that case, the magnetic resistance of the magnetic circuit becomes small, and the generated torque itself becomes large. Naturally, an adsorption force may possibly be generated between the first bearing 512 and the rotation shaft 510 or between the second bearing 513 and the rotation shaft 510 to cause a torque loss due to a frictional force or impair durability of sliding surfaces. However, by subjecting a surface of the first bearing 512, rotation shaft 510, or the second bearing 513 to application of a lubricant, lubricant coating (fluorine-based lubricant coating, graphite-based lubricant coating, molybdenum disulfide-based lubricant coating, or the like), lubricant plating (for example, plating of electroless nickel containing polytetrafluoro-ethylene (PTFE) particles, electroless nickel plating using a Teflon (registered trademark) lubricant, or the like), or the like, the torque loss due to the friction between the sliding surfaces can be suppressed, the impairment of the durability of sliding surfaces can be prevented, and the stepping motor having a large output torque can be achieved.

The first coil 502 is arranged between the external cylindrical portion of the first stator 508 and the rotation shaft 510 and in the vicinity of a coupling portion disposed via the first bearing 512, such that one end side of the magnet ring 501 is sandwiched between the first outside magnetic pole portions 508A and 508B of the first stator 508 and the first inside magnetic pole portion 510A of the rotation shaft 510. The second coil 503 is arranged between the external cylindrical portion of the second stator 509 and the rotation shaft 510 and in the vicinity of a coupling portion disposed via the second bearing 513, such that the other end side of the magnet ring 501 is sandwiched between the second outside magnetic pole portions 509A and 509B of the second stator 509 and the second inside magnetic pole portion 510B of the rotation shaft 510. In other words, the outside magnetic pole portions 508A and 508B, 509A, and 509B are opposed to the outer peripheral surface of the magnet ring 501, the inside magnetic pole portions 510A and 510B are located on the inner peripheral surface of the magnet ring 501, the first outside magnetic pole portion 508A and the first inside magnetic pole portion 510A are opposed to each other, and similarly, the second outside magnetic pole portions 509A and 509B are opposed to each other.

A coupling ring 514 formed of a cylindrical shape includes grooves 514A and 514B formed on one end side of an inside portion of the coupling ring 514 and grooves 514C and 514D formed on the other end side thereof. The phase of the grooves 514C and 514D and the phase of the grooves 514A and 514B are shifted by 180/n°, that is, 45°. The grooves 514A and 514B and the grooves 514C and 514D are formed so as to have a predetermined distance therebetween. The first outside magnetic pole portions 508A and 508B and the second outside magnetic pole portions 509A and 509B are fitted into the grooves 514A and 514B and the grooves 514C and 514D, respectively, to be fixed by an adhesive or the like. By fixing the first stator 508 and the second stator 509 to the coupling ring 514 as described above, the first stator 508 and the second stator 509 can be arranged into desired positions and phases. Also, the coupling ring 514 is formed of a non-magnetic material, so that the magnetic circuit can be separated by a region between the first stator 508 and the second stator 509, making it difficult for the magnetic poles to affect each other.

According to the fifth embodiment, the inner diameter portion of the magnet ring 501 is filled with the first inside magnetic pole portion 510A and the second magnetic pole portion 510B of the rotation shaft 510, thereby having a larger mechanical strength than that of the conventional stepping motor. Further, the rotation shaft 510 also functions as so-called back metals for reducing the magnetic resistance between the S pole and the N pole that are generated in the inner diameter portion of the magnet ring 501, so that a permeance coefficient of the magnetic circuit is set high. Accordingly, even if used under a high temperature environment, the magnet ring 501 rarely undergoes magnetic deterioration due to demagnetization.

The first stator 508 and the second stator 509 each have a simple cup-like shape having a notch provided in the outside cylindrical portion thereof, thereby facilitating the assembly. If the stepping motor is structured as in the same manner as the conventional stepping motor, each of the first stator and the second stator needs to have its inside magnetic pole portions formed integrally with the outside magnetic pole portions, and it is difficult to structure the inside magnetic pole portions and the outside magnetic pole portions as a unitary part in terms of manufacturing processes. For example, it takes higher cost to mold the part by metal injection molding. It also becomes more difficult to unitarily manufacture the part by pressing as the part becomes smaller in size, which is more prominently observed than the case of manufacturing a part forming the outside magnetic pole portion. Further, in the case where the inside magnetic pole portions and the outside magnetic pole portions are separately manufactured and then integrally fixed to one another by caulking, welding, bonding, etc., the manufacturing cost increases. In other words, the conventional stepping motor needs at least nine parts in total (two coils, a magnet ring, an output shaft, a first stator composed of two parts for forming outside magnetic pole portions and inside magnetic pole portions, a second stator composed of two parts for forming outside magnetic pole portions and inside magnetic pole portions, and a coupling ring), while the stepping motor according to the fifth embodiment can be structured by seven parts in total (two coils, a magnet ring, a rotation shaft corresponding to the output shaft, a first stator composed of a part for forming outside magnetic pole portions, a second stator composed of a part for forming outside magnetic pole portions, and a coupling ring), thereby reducing the manufacturing cost and facilitating the manufacture.

Further, the motor proposed by the conventional stepping motor needs to be assembled while maintaining the precision of the clearances between the outer diameter portion of the magnet and the outside magnetic pole portions. Moreover, the inside magnetic pole portions and the magnet need to be arranged so as to have a predetermined clearance therebetween, so that the predetermined clearance may not be secured due to the variation of parts precision or the lack of assembly precision, increasing the risk of causing a defect that an inside magnetic pole portion contacts the magnet, or the like. On the contrary, according to the fifth embodiment, the magnet has only to be managed in terms of the clearance of its outer diameter portion, thereby facilitating the manufacture. Further, in the fifth embodiment, the first inside magnetic pole portion and the second inside magnetic pole portion are unitarily formed of a single part instead of using different parts, thereby making it possible to attain the stepping motor with the two portions having small mutual differences and with improved precision.

Further, the conventional stepping motor needs to be structured such that the inside magnetic pole portions do not contact a portion where the magnet and the output shaft are connected, making it impossible to secure a sufficient length for the axial length (indicated by L1 of FIG. 2) of a region where the inside magnetic pole portions and the magnet are opposed to each other. On the contrary, according to the fifth embodiment, as indicated by L2 of FIG. 16, the sufficient length can easily be secured for the axial length of the region where the inside magnetic pole portions and the magnet are opposed to each other. Accordingly, the outside magnetic pole portions and the magnet can be put to effective use, and the output of the stepping motor can be enhanced.

FIGS. 18A to 18H are sectional views taken along a line A—A of FIG. 16 and sectional views taken along a line B—B of FIG. 16, which will be used to explain rotation drives of the stepping motor. FIGS. 18A and 18E are the sectional views obtained at the same point in time, FIGS. 18B and 18F are the sectional views obtained at the same point in time, FIGS. 18C and 18G are the sectional views obtained at the same point in time, and FIGS. 18D and 18H are the sectional views obtained at the same point in time.

In a state shown in FIGS. 18A and 18E, when currents are caused to flow through the first coil 502 and the second coil 503 to excite the outside magnetic pole portions 508A and 508B of the first stator 508 into the N poles and the outside magnetic pole portions 509A and 509B of the second stator 509 into the S poles, the magnet ring 501 serving as a rotor is rotated counterclockwise by 45°, resulting in the state shown in FIGS. 18B and 18F. Then, when the direction of the current flowing through the first coil 502 is reversed to excite the outside magnetic pole portions 508A and 508B of the first stator 508 into the S poles and the second outside magnetic pole portions 509A and 509B of the second stator 509 into the S poles, the magnet ring 501 serving as a rotor is further rotated counterclockwise by 45°, resulting in the state shown in FIGS. 18C and 18G. After that, when the direction of the current flowing through the second coil 503 is reversed to excite the outside magnetic pole portions 508A and 508B of the first stator 508 into the S poles and the outside magnetic pole portions 509A and 509B of the second stator 509 into the N poles, the magnet ring 501 serving as a rotor is further rotated counterclockwise by 45°, resulting in the state shown in FIGS. 18D and 18H.

From then on, by switching the directions of the currents flowing through the first coil 502 and the second coil 503 in order, the magnet ring 501 serving as a rotor is rotated to reach a position corresponding to the phase defined by the flowing currents.

Further, two magnetic layers that are each obtained by dividing the outer peripheral surface of the magnet ring 501 may be provided in the axial direction, such that the phases of one magnetic layer opposed to the first stator 508 and the other magnetic layer opposed to the second stator 509 are shifted by 180/n°, and the phases of the first stator 508 and the second stator 509 coincide with each other.

According to the fifth embodiment described above, the magnetic flux lines generated from the coils are adapted to act directly on the magnet, thereby enabling the stepping motor to obtain an increased output and to be reduced in size. In other words, the diameter of the stepping motor has only to be large enough to oppose the magnetic pole of the stator to the diameter of the magnet. Also, the axial length of the stepping motor has only to be the same as the length obtained by adding the length of the first coil to that of the second coil. Accordingly, since the size of the stepping motor is determined by the diameters and the axial lengths of the magnet and the coils, if the diameters and the axial lengths of the magnet and the coils are extremely reduced, the stepping motor can be microminiaturized.

At this time, if the diameters and the axial lengths of the magnet and the coil are extremely reduced, it becomes difficult to maintain the precision of the stepping motor. However, the problem with the precision of the stepping motor is solved by the simple structure in which the magnet is formed into a hollow cylindrical shape, and the outside magnetic pole portions and the inside magnetic pole portions of the first stator and the second stator are opposed to the outer peripheral surface and the inner peripheral surface of the magnet formed into a hollow cylindrical shape. Further, as described above, the stepping motor with reduced manufacturing cost and an increased output can be achieved. Note that only one stator may have its inside magnetic pole portion arranged so as to have a predetermined clearance with respect to the inner diameter portion of the magnet, and the other stator may have its inside magnetic pole portion formed of a rotation shaft of a soft magnetic material as described in the above embodiments. Also in that case, the improved performance can be attained compared to the conventional stepping motor.

Sixth Embodiment

Figure 19:
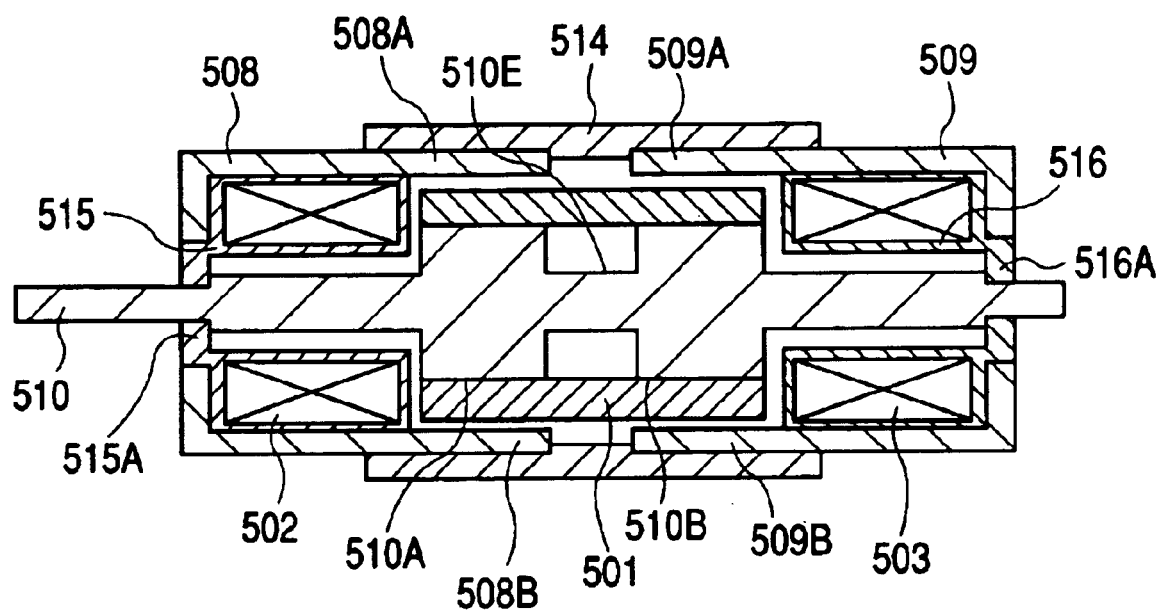
FIG. 19 is a sectional view of a stepping motor taken along its axial direction according to a sixth embodiment of the present invention.

FIG. 19 is a sectional view of a stepping motor according to a sixth embodiment of the present invention. The same structural components as those of the fifth embodiment are denoted by the same symbols. Thus, description of those components will be omitted.

In FIG. 19, the first coil 502 is wound in a first bobbin 515. The first bobbin 515 is formed of a non-magnetic, non-conductive material so as not to cause an unnecessary continuity between the first coil 502 and the first stator 508. The first bobbin 515 is fixed to the first stator 508, and includes a hole 515A at which the rotation shaft 510 is rotatably supported and which functions similarly as the first bearing 512 of the fifth embodiment. The second coil 503 is wound in a second bobbin 516. The second bobbin 516 is formed of a non-magnetic, non-conductive material so as not to cause an unnecessary continuity between the second coil 503 and the second stator 509. The second bobbin 516 is fixed to the second stator 509, and includes a hole 516A at which the rotation shaft 510 is rotatably supported and which functions similarly as the second bearing 513 of the fifth embodiment described above.

According to the sixth embodiment, the unnecessary continuity is prevented between the first coil 502 and the first stator 508, while a member for preventing the adsorption between the first stator 508 and the rotation shaft 510 is formed of a single part, that is, the first bobbin 515, thereby achieving the structure that is assembled with ease and with reduced cost and allows a stable operation. Similarly, the unnecessary continuity is prevented between the second coil 503 and the second stator 509, while a member for preventing the adsorption between the second stator 509 and the rotation shaft 510 is formed of a single part, that is, the second bobbin 516, thereby achieving the structure that is assembled with ease and with reduced cost and allows a stable operation.

According to the embodiments 5 and 6 described above, provided that the portion of the output shaft 510, which is opposed to the first outside magnetic pole portions 508A and 508B and fixed to the inner peripheral surface of the magnet ring 501, is called the first inside magnetic pole portion 510A, the magnetic flux lines generated from the first coil 502 pass the region between the first outside magnetic pole portions 508A and 508B opposed to the outer peripheral surface of the magnet ring 501 and the first inside magnetic pole portion 510A of the rotation shaft 510 fixed to the inner peripheral surface of the magnet ring 501, thereby acting effectively on the magnet ring 501. At this time, there is no need to secure a clearance between the inner peripheral surface of the magnet ring 501 and the first inside magnetic pole portion 510A of the rotation shaft 510 opposed thereto. Accordingly, it is possible to reduce the distance between the outside magnetic pole portions 508A and 508B and the inside magnetic pole portion 510A, reduce the magnetic resistance, and enhance the output as compared with the stepping motor proposed in Japanese Patent Application Laid-open No. H09-331666 or in Japanese Patent Application Laid-open No. H10-229670.

Similarly, provided that the portion of the rotation shaft 510, which is opposed to the first outside magnetic pole portions 509A and 509B and fixed to the inner peripheral surface of the magnet ring 501, is called the second inside magnetic pole portion 510B, the magnetic flux lines generated from the first coil 502 pass the region between the second outside magnetic pole portions 509A and 509B opposed to the outer peripheral surface of the magnet ring 501 and the second inside magnetic pole portion 510B of the rotation shaft 510 fixed to the inner peripheral surface of the magnet ring 501, thereby acting effectively on the magnet ring 501. At this time, there is no need to secure a clearance between the inner peripheral surface of the magnet ring 501 and the second inside magnetic pole portion 510B of the rotation shaft 510 opposed thereto. Accordingly, it is possible to reduce the distance between the second outside magnetic pole portions 509A and 509B and the second inside magnetic pole portion 510B, reduce the magnetic resistance, and enhance the output.

Further, the first inside magnetic pole portion 510A and the second inside magnetic pole portion 510B are formed of the single rotation shaft 510, thereby allowing the manufacture with ease and with reduced cost. Further, the magnet ring 501 has the rotation shaft 510 fixed to its inner diameter portion, thereby being outstanding in its mechanical strength.

In other words, the stepping motor has a small number of the structural parts, and is composed of the parts easy for manufacture. Also, the inside magnetic pole portions 510A and 510B can be formed to have a large length. Accordingly, the outside magnetic pole portions 508A, 508B, 509A, and 509B, and the magnet ring 501 can be put to effective use, and the output of the stepping motor can be enhanced. In addition, the magnet ring 501 has only to be managed in terms of the clearance of its outer diameter portion with respect to the outside magnetic pole portions 508A, 508B, 509A, and 509B, thereby facilitating the assembly. Further, the mechanical strength of the magnet ring 501 increases, and the rotation shaft 510 functions as the back metals. Accordingly, the stepping motor rarely undergoes magnetic deterioration.

Further, the first coil 502 and the second coil 503 have substantially the same diameter as the magnet ring 501, and are arranged so as to axially sandwich the magnet ring 501. Accordingly, the outer diameter size of the stepping motor can be reduced.

Further, the portions in which the rotation shaft 510 is fixed to the inner diameter portion of the magnet ring 501 in such an axial range as to be opposed to the first outside magnetic pole portions 508A and 508B, that is, the first inside magnetic pole portion 510A, and in such an axial range as to be opposed to the second outside magnetic pole portions 509A and 509B, that is, the second inside magnetic pole portion 510B, each have an outer diameter size of D1. The groove having an outer diameter sizes of D2 smaller than D1 is formed between the first inside magnetic pole portion 510A and the second inside magnetic pole portion 510B, so that the magnetic resistance in the groove becomes large. As a result, it can be prevented that the magnetic flux lines generated by causing a current through the first coil 502 adversely affect the second coil 503, the second outside magnetic pole portions 509A and 509B, and the second inside magnetic pole portion 510B via the rotation shaft 510 formed of a soft magnetic material, and the magnetic flux lines generated by causing a current through the second coil 503 adversely affect the first coil 502, the first outside magnetic pole portions 508A and 508B, and the first inside magnetic pole portion 510A via the rotation shaft 510 formed of a soft magnetic material, which may cause unstable rotation.

What is claimed is:

1. An actuator, comprising:
   a rotor that includes:
      a magnet that has a cylindrical shape, and an outer peripheral surface alternately magnetized into different poles in a peripheral direction; and
      a soft magnetic member that is fixed to an inner diameter portion of the magnet;
   a coil that is concentric with the magnet, and arranged adjacently to the magnet in an axial direction thereof; and
   a stator that has a magnetic pole portion opposed to the outer peripheral surface of the magnet,
   wherein the soft magnetic member composing the rotor, and the stator are excited by the coil, and
   wherein the rotor is inserted into an inner diameter portion of the coil and the soft magnetic member included within the rotor and fixed to an inner diameter portion of the magnet is capable of rotating as the rotor, together with the magnet.

2. An actuator according to claim 1, wherein the magnetic pole portion of the stator is formed into a shape extending in a direction of rotation axis of the magnet along a shape of an opposed surface of the magnet.

3. An actuator according to claim 1, wherein said soft magnetic member is arranged on an inner diameter side of the magnet.

4. An actuator according to claim 1, wherein the soft magnetic member composing the rotor is an output shaft.

5. An actuator, comprising:
   a magnet ring that is equally divided in a peripheral direction, and includes a permanent magnet having a cylindrical shape and having different poles magnetized alternately;
   a first coil and a second coil each having a cylinder shape which are concentric with the magnet ring, and arranged in opposite positions across the magnet ring along an axial direction thereof;
   a first outside magnetic pole portion that is opposed to a partial outer peripheral surface of the magnet ring on a side of the first coil so as to have a predetermined clearance, and is excited by the first coil;
   a second outside magnetic pole portion that is opposed to another partial outer peripheral surface of the magnet ring on a side of the second coil so as to have a predetermined clearance, and is excited by the second coil;
   a first shaft that is formed of a soft magnetic material, inserted into an inner diameter portion of the first coil, and fixed to an inner diameter portion of the magnet ring; and
   a second shaft that is formed of a soft magnetic material, inserted into an inner diameter portion of the second coil, and fixed to an inner diameter portion of the magnet ring.

6. An actuator according to claim 5, wherein the first shaft is an output shaft.

7. An actuator according to claim 5, wherein:
   the first shaft is rotatably supported by the first bearing fixed to the first outside magnetic pole portion; and
   the second shaft is rotatably supported by the second bearing fixed to the second outside magnetic pole portion.

8. An actuator according to claim 5, wherein the first bobbin and the second bobbin also serve as the first bearing and the second bearing, respectively.

9. An actuator according to claim 5, wherein:
   the first shaft is fixed to the first outside magnetic pole portion, and rotatably supported by the first bearing formed of a soft magnetic material;
   the second shaft is fixed to the second outside magnetic pole portion, and rotatably supported by the second bearing formed of a soft magnetic material; and
   at least one of the first shaft, the first bearing, the second shaft, and the second bearing has its sliding surface subjected to one of lubricant coating and lubricant plating, and has its sliding portion subjected to lubricant application.

10. An actuator, comprising:
   a magnet ring that is equally divided in a peripheral direction, and includes a permanent magnet having a cylindrical shape and having different poles magnetized alternately;
   a first coil and a second coil that are concentric with the magnet ring, and arranged in opposite positions across the magnet ring along an axial direction thereof;
   a first outside magnetic pole portion that is opposed to a partial outer peripheral surface of the magnet ring closer to one end surface thereof, and is excited by the first coil;
   a second outside magnetic pole portion that is opposed to another partial outer peripheral surface of the magnet ring closer to another end surface thereof, and is excited by the second coil; and
   a rotation shaft that:
      is formed of a soft magnetic material;
      is fixed to an inner diameter portion of the magnet ring; and
      includes at least an inside magnetic pole portion that is respectively opposed to one of the first outside magnetic pole portion and the second outside magnetic pole portion in an axial range thereof, and are respectively excited by one of the first coil and the second coil.

11. An actuator according to claim 10, wherein said actuator is a stepping motor.

12. An actuator, comprising:
- a magnet ring that is equally divided in a peripheral direction, and includes a permanent magnet having a cylindrical shape and having different poles magnetized alternately;
- a first coil and a second coil that are concentric with the magnet ring, and arranged in opposite positions across the magnet ring along an axial direction thereof;
- a first outside magnetic pole portion that is opposed to a partial outer peripheral surface of the magnet ring closer to one end surface thereof, and is excited by the first coil;
- a second outside magnetic pole portion that is opposed another partial outer peripheral surface of the magnet ring closer to another end surface thereof, and is excited by the second coil; and
- a rotation shaft that:
    - is formed of a soft magnetic material;
    - is fixed to an inner diameter portion of the magnet ring;
    - includes a first inside magnetic pole portion and a second inside magnetic pole portion that are respectively opposed to the first outside magnetic pole portion and the second outside magnetic pole portion in axial ranges thereof, and are respectively excited by the first coil and the second coil; and
    - is formed with a groove between the axial range of the first inside magnetic pole portion opposed to the first outside magnetic pole portion and the axial range of the second inside magnetic pole portion opposed to the second outside magnetic pole portion.

13. An actuator according to claim 12, wherein said actuator is a stepping motor.

* * * * *

UNITED STATES PATENT AND TRADEMARK OFFICE
CERTIFICATE OF CORRECTION

PATENT NO. : 6,979,918 B2
APPLICATION NO. : 10/735660
DATED : December 27, 2005
INVENTOR(S) : Chikara Aoshima et al.

It is certified that error appears in the above-identified patent and that said Letters Patent is hereby corrected as shown below:

Column 2,
Line 26, "a," should read -- a --.

Column 7,
Line 58, "view" should read -- viewed --.

Column 8,
Line 22, "view" should read -- viewed --.

Column 9,
Line 26, "rotates" should read -- rotate --.

Column 19,
Line 50, "functions" should read -- function --.

Column 20,
Line 56, "word," should read -- words, --.

Column 29,
Line 19, "opposed" should read -- opposed to --.

Signed and Sealed this

Twentieth Day of June, 2006

JON W. DUDAS
*Director of the United States Patent and Trademark Office*